United States Patent
Siaw et al.

(10) Patent No.: US 11,836,318 B1
(45) Date of Patent: Dec. 5, 2023

(54) DISPLAY FLICKER REDUCTION

(71) Applicant: STMicroelectronics Asia Pacific Pte Ltd., Singapore (SG)

(72) Inventors: Tchung Jing Siaw, Singapore (SG); Chen Khoi Chin, Singapore (SG); Jenn Woei Soo, Singapore (SG); Cheng Hung Lin, Singapore (SG)

(73) Assignee: STMicroelectronics Asia Pacific Pte Ltd., Singapore (SG)

( * ) Notice: Subject to any disclaimer, the term of this patent is extended or adjusted under 35 U.S.C. 154(b) by 0 days.

(21) Appl. No.: 17/901,067

(22) Filed: Sep. 1, 2022

(51) Int. Cl.
*G06F 3/044* (2006.01)
*G06F 3/041* (2006.01)
*G09G 3/20* (2006.01)

(52) U.S. Cl.
CPC ........ *G06F 3/04184* (2019.05); *G06F 3/0441* (2019.05); *G06F 3/0442* (2019.05); *G06F 3/0446* (2019.05); *G09G 3/2096* (2013.01); *G09G 2320/0247* (2013.01)

(58) Field of Classification Search
CPC .. G06F 3/04184; G06F 3/0441; G06F 3/0442; G06F 3/0446; G09G 3/2096; G09G 2320/0247
See application file for complete search history.

(56) References Cited

U.S. PATENT DOCUMENTS

| | | | |
|---|---|---|---|
| 11,422,663 B1 * | 8/2022 | Tan | G06F 3/03545 |
| 2022/0050576 A1 * | 2/2022 | Jo | G06F 3/0412 |

OTHER PUBLICATIONS

UTMEL, "Introduction to DDIC (Display Driver IC)", UTMEL Electronic, Feb. 17, 2022, https://www.utmel.com/blog/categories/integrated%20circuit/introduction-to-ddic-display-driver-ic, accessed on Dec. 1, 2022, 6 Pages.

* cited by examiner

*Primary Examiner* — Lisa S Landis
(74) *Attorney, Agent, or Firm* — Slater Matsil, LLP

(57) ABSTRACT

A method for operating an electronic device includes a touchscreen controller determining based on a frequency of a vertical synchronization signal (Vsync), whether a first display frame includes an idle time, the idle time being a duration of time remaining in the first display frame after an image displayed on a display of the electronic device is updated during the first display frame. The method further includes in response to determining that the first display frame includes the idle time, the touchscreen controller transmitting an uplink signal in the first display frame, the uplink signal being transmitted during the idle time of the first display frame.

23 Claims, 13 Drawing Sheets

DISPLAY FLICKER REDUCTION

TECHNICAL FIELD

The present invention relates generally to displays and, in particular embodiments, to display flicker reduction.

BACKGROUND

Electronic devices that are designed for user interaction have historically utilized external input devices such as keyboards, key pads, and/or mice to capture user input. In recent years, there has been a push from the more traditional methods, as consumers prefer the convenience of portable devices that can support a more flexible lifestyle. To this end, there has been a rise in smaller, portable, hand-held electronic devices, such as mobile phones, tablets, gaming systems, etc. This has given rise to the popularity of touch screens and touch panel displays as systems for capturing user input. Not only do they provide the functionality of the traditional electronic devices, but touchscreens provide additional features. For example, given the appropriate hardware and software, users are able to utilize touchscreens for sketching, drawing, and various hand writing applications.

Today's display technologies such as organic light emitting diodes (OLEDs) offer a higher performance display. With the increasing use of advanced displays, thinner displays that are flexible or even foldable are emerging as a way to increase the size of a display without increasing the size of the device.

Thinner displays may come with their own set of advantages and disadvantages. A display panel of an OLED based touchscreen may include a plurality of pixels arranged in rows and columns across a display layer in a matrix like formation. Each pixel may include an OLED configured to generate light based on the current driven through it. A display driver and a touchscreen controller of a display may share the same common ground. Thus, when uplink signals are transmitted by the touchscreen controller for communication with an active stylus pen, noticeable display flicker may occur because the uplink signals may interfere with control signal and image data transmitted by the display driver. Therefore, techniques to solve such display flicker issues are desired.

SUMMARY

In accordance with an embodiment, a method for operating an electronic device includes a touchscreen controller determining based on a frequency of a vertical synchronization signal (Vsync), whether a first display frame includes an idle time, the idle time being a duration of time remaining in the first display frame after an image displayed on a display of the electronic device is updated during the first display frame. The method further includes in response to determining that the first display frame includes the idle time, the touchscreen controller transmitting an uplink signal in the first display frame, the uplink signal being transmitted during the idle time of the first display frame.

In accordance with an embodiment, for operating an electronic device includes a touchscreen controller detecting an active stylus pen, the touchscreen controller coupled to a touch sensing layer of a display of the electronic device, the touch sensing layer comprising a plurality of touch sensors including transmitting (TX) touch sensors arranged in rows across the touch sensing layer and receiving (RX) touch sensors arranged in columns across the touch sensing layer. The method further includes in response to determining that the touchscreen controller has not detected the active stylus pen, transmitting in a first display frame a first uplink signal from a first region of the touch sensing layer, the first uplink signal from a second region of the touch sensing layer, and the first uplink signal with opposite polarity from a third region of the touch sensing layer. The method further includes in response to determining that the touchscreen controller has not detected the active stylus pen, transmitting in a second display frame a second uplink signal from the first region of the touch sensing layer, the second uplink signal with opposite polarity from the second region of the touch sensing layer, and the second uplink signal from the third region of the touch sensing layer.

In accordance with an embodiment, a method for operating an electronic device includes a touchscreen controller detecting an active stylus pen, the touchscreen controller coupled to a touch sensing layer of a display of the electronic device, the touch sensing layer comprising a plurality of touch sensors including TX touch sensors arranged in rows across the touch sensing layer and RX touch sensors arranged in columns across the touch sensing layer. The method further includes in response to determining that the touchscreen controller has detected the active stylus pen, the touchscreen controller transmitting an uplink signal from a pen zone of the touch sensing layer in a frame, the pen zone including a TX touch sensor and a RX touch sensor associated with a current location of the active stylus pen, the TX touch sensor and the RX touch sensor receiving a strongest downlink signal transmitted by the active stylus pen. The method further includes in response to determining that the touchscreen controller has detected the active stylus pen, the touchscreen controller transmitting the uplink signal with opposite polarity from a first group of touch sensors of a non-pen zone of the touch sensing layer in the frame, the non-pen zone being the plurality of touch sensors excluding the pen zone.

BRIEF DESCRIPTION OF THE DRAWINGS

For a more complete understanding of the present invention, and the advantages thereof, reference is now made to the following descriptions taken in conjunction with the accompanying drawings, in which:

FIG. 2A illustrates a timing diagram for updating a display with variable refresh rates, and FIG. 2B illustrates a timing diagram for preventing display flicker when the display transmits an uplink signal to an active stylus pen during an idle time;

DETAILED DESCRIPTION OF ILLUSTRATIVE EMBODIMENTS

The making and using of various embodiments are discussed in detail below. It should be appreciated, however, that the various embodiments described herein are applicable in a wide variety of specific contexts. The specific embodiments discussed are merely illustrative of specific ways to make and use various embodiments, and should not be construed in a limited scope.

Reference to "an embodiment" or "one embodiment" in the framework of the present description is intended to indicate that a particular configuration, structure, or characteristic described in relation to the embodiment is included in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments. The references used herein are provided merely for convenience and hence do not define the extent of protection or the scope of the embodiments.

While today's display technologies have led to great advances in the evolution of portable devices, limitations still exist. Conventional organic light emitting diode (OLED) devices may include a display panel that may include a plurality of pixels arranged in rows and columns across a display layer in a matrix like formation. Each pixel may include an OLED configured to generate light based on the current driven through it. When uplink signals are transmitted by the touchscreen controller for communication with an active stylus pen, noticeable display flicker may occur because the uplink signals may interfere with control signal and image data transmitted by the display driver.

Embodiments of the present application relate to a method for preventing display flicker of an electronic device in communication with an active stylus pen.

Although in this disclosure some embodiments are described in the context of an OLED display, it should be appreciated that such embodiments are not so limited and are equally applicable to a touchscreen display implemented using any other display technologies.

Figure 1A:
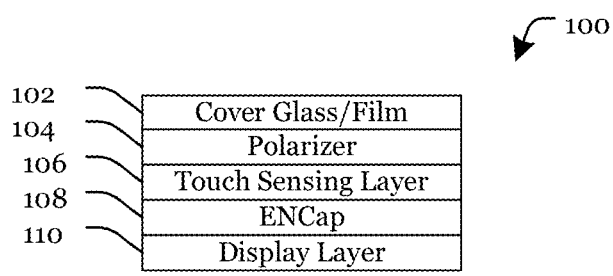
FIGS. 1A-1C illustrate an electronic device with a touchscreen display configured to prevent display flicker according to an embodiment of the present application.

FIG. 1A illustrates a stack-up diagram of a touchscreen-based display panel 100. The display panel 100 may be an organic light emitting diode (OLED) display or any other type of display integrated with a touch sensing function. The display panel 100 may also be referred to as a touchscreen, a touchscreen display or a touch display. The display panel 100 may include a stack-up of a plurality of different layers. As a non-limiting example, the display panel 100 may comprise a cover glass or cover film layer 102, a polarizer film layer 104, a touch sensing layer 106, an encapsulation film layer 108, and a display layer 110. The display layer 110 may comprise a plurality of pixel elements formed across rows and columns of the display panel 100 in an array like formation. The pixel elements may be OLED and may be configured to transmit light having a color (such as red, green, or blue) with a brightness based on the current they are driven with. The pixel elements may also be implemented based on non-OLED techniques. The encapsulation film layer 108 may be formed in direct contact with the display layer 110. The encapsulation film layer 108 may function to prevent oxygen, water, or moisture from external sources reaching into and damaging the display layer 110. The touch sensing layer 106 may be a capacitive touch panel configured to detect touches made on the display panel 100.

The touch sensing layer 106 may include a plurality of touch sensing electrodes (also called touch sensors). The touch sensing electrodes may be deposited and attached onto the encapsulation film layer 108 (e.g., in an on-cell type display). Alternatively, the touch sensing electrodes may be printed or fabricated with the encapsulation film layer 108 (e.g., in an in-cell type display). The polarizer film layer 104 may be used for controlling the characteristics of the display panel 100 such as external light reflection, color accuracy, luminance, and so on. The cover glass or cover film layer 102 may be a protective layer to protect the display panel 100. The cover glass or cover film layer 102 may comprise a transparent material such as a thin layer of glass including silicon dioxide. Additional layers known in the art may also be included in the display panel 100.

Figure 1B:
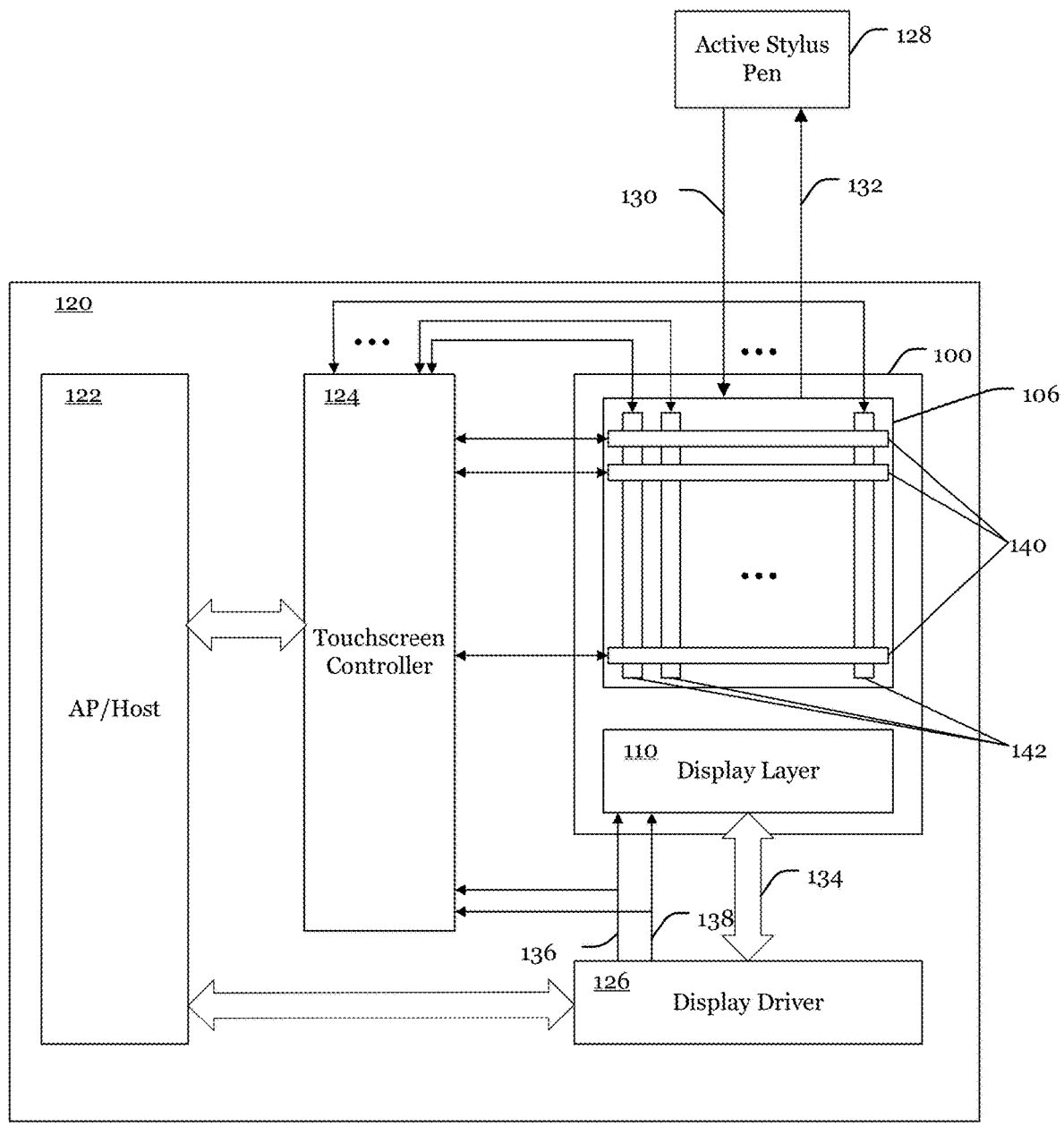

FIG. 1B is a block diagram of an electronic device 120 according to some embodiments. The electronic device 120 may include a display panel 100, a host 122, a touchscreen controller 124, and a display driver 126. The electronic device 120 may be a smart phone, a Global Positioning System (GPS) device, a tablet computer, a mobile media player, a laptop, a gaming system, a personal computer, or any other electronic device that may utilize a touchscreen display (such as the display panel 100). The touchscreen controller 124 may communicate with an active stylus pen 128.

The host 122, also referred to as a system on a chip or an application processor (AP), comprises a processor, interface, circuitry, and the like configured to direct the flow of input and output data to the touchscreen controller 124 and the display driver 126. For example, the host 122 may be the CPU of a smartphone. A memory may be coupled to or otherwise integrated with the host 122. The memory may be programmed for short term and/or long term memory storage. The memory may comprise various programs to be executed in the host 122. The memory may include both volatile and non-volatile memories. The host 122 may be configured to, e.g., transmit image data, updated display refresh rates, and/or synchronization signals to the display driver 126 and to receive touch related signals such as coordinates or touch control signals from the touchscreen controller 124.

The display panel 100 may include a touch sensing layer 106 and a display layer 110. The display layer 110 is configured to display an image in accordance with display signals 134 and synchronization signals (including a VSYNC signal 136 and an HSYNC signal 138) received from the display driver 126. The display driver 126 may perform various methods with respect to the display panel 100. In various embodiments, the display driver 126 may be a processor that analyzes information and carries out a series of executable scripts, e.g., stored in a memory integrated in the display driver 126. Alternatively, the display driver 126 and the touchscreen controller 124 may share a common memory. In one or more embodiments, the processor may comprise an application-specific integrated circuit (ASIC) device, a central processing unit (CPU), or any other processing unit known in the art. In various embodiments, the display driver 126 may refresh an image displayed on the display panel 100 based on a display refresh rate and/or synchronization signals received from the host 122. The display driver 126 may transmit the VSYNC signal 136 and the HSYNC signal 138 to the touchscreen controller 124.

The touch sensing layer 106 in the display panel 100 is configured to detect touches made on the display panel 100. The touch sensing layer 106 may include transmitting (TX) touch sensors 140 and receiving (RX) touch sensors 142.

The TX touch sensors may also be referred to as TX electrodes or TX channels. The RX touch sensors may also be referred to as RX electrodes or RX channels. The TX touch sensors 140 and RX touch sensors 142 may span the entirety of the display panel 100 or the touch sensing layer 106 in a grid-like fashion that are operable by the touchscreen controller 124. In various embodiments, the TX touch sensors 140 may be formed in rows across the touch sensing layer 106 and the RX touch sensors 142 may be formed in columns across the touch sensing layer 106. In other embodiments, the RX touch sensors 142 may be formed in rows across the touch sensing layer 106 and the TX touch sensors 140 may be formed in columns across the touch sensing layer 106. The TX touch sensors 140 and the RX touch sensors 142 may overlap in certain embodiments. While FIG. 1B depicts the TX touch sensors 140 and the RX touch sensors 142 overlapping in an orthogonal manner, they may overlap other than orthogonally such as being interleaved or at various angles.

The touchscreen controller 124 may perform various methods with respect to the display panel 100. In various embodiments, the touchscreen controller 124 may be a processor that analyzes information and carries out a series of executable scripts, e.g., stored in a memory integrated in the touchscreen controller 124. For example, the memory may include non-volatile memory (such as read-only memory (ROM) or Flash) and random access memory (RAM). In one or more embodiments, the processor may comprise an application-specific integrated circuit (ASIC) device, a central processing unit (CPU), or any other processing unit known in the art. In various embodiments, the touchscreen controller 124 may comprise a number of separate computing units such as cores integrated within one processor, or distinct separate processing chips.

The touchscreen controller 124 may be coupled to the TX touch sensors 140 and the RX touch sensors 142. During a touch sensing operation or a touch scan operation, the touchscreen controller 124 may transmit touch driving signals (TDS) to the TX touch sensors 140 of the touch sensing layer 106 and receive touch sensing signal (TSS) from the RX touch sensors 142 of the touch sensing layer 106. If a finger presses on an intersection of one TX touch sensor 140 and one RX touch sensor 142, the mutual capacitance or self-capacitance of these sensors will be changed. Thus, the finger touch will be detected and the TSS will be changed. The touchscreen controller 124 may measure and analyze the TSS, and then report touch coordinates to the host 122.

When the active stylus pen 128 is in close proximity to the touch sensing layer 106, the TX touch sensors and the RX touch sensors may sense active signals transmitted from the active stylus pen 128 to detect it and measure its coordinates. In various embodiments, to improve the sensitivity between the touch sensing layer 106 and the active stylus pen 128, the touch sensing layer 106 and the active stylus pen 128 may communicate bi-directionally. The touch sensing layer 106 may be configured to transmit an uplink signal 132 generated by the touchscreen controller 124 to the active stylus pen 128 and receive a downlink signal 130 generated and transmitted from the active stylus pen 128. The uplink signal 132 may also be referred to as a beacon.

The touchscreen controller 124 may trigger the touch sensing layer 106 to transmit an uplink signal 132 to the active stylus pen 128 and receive a downlink signal 130 from the active stylus pen 128. The uplink signal 132 may be transmitted by the TX touch sensors 140, or the RX touch sensors 142, or both the TX touch sensors 140 and the RX touch sensors 142. Flicker may be induced by the uplink signal 132 triggered by the touchscreen controller 124 to communicate with the active stylus pen 128. Specifically, when the uplink signal 132 is transmitted by the touch sensing layer 106 during the display updating, interference to the display layer 110 may occur. This may lead to a reduced brightness of the display layer 110, resulting in noticeable flicker on the display panel 100 by a user.

In one or more embodiments, the active stylus pen 128 may be held in a hand of the user and used to input more precise handwriting, drawings, sketches, and other inputs into the electronic device 120 while touching an active tip of the active stylus pen 128 to the touch sensing layer 106.

Figure 1C:
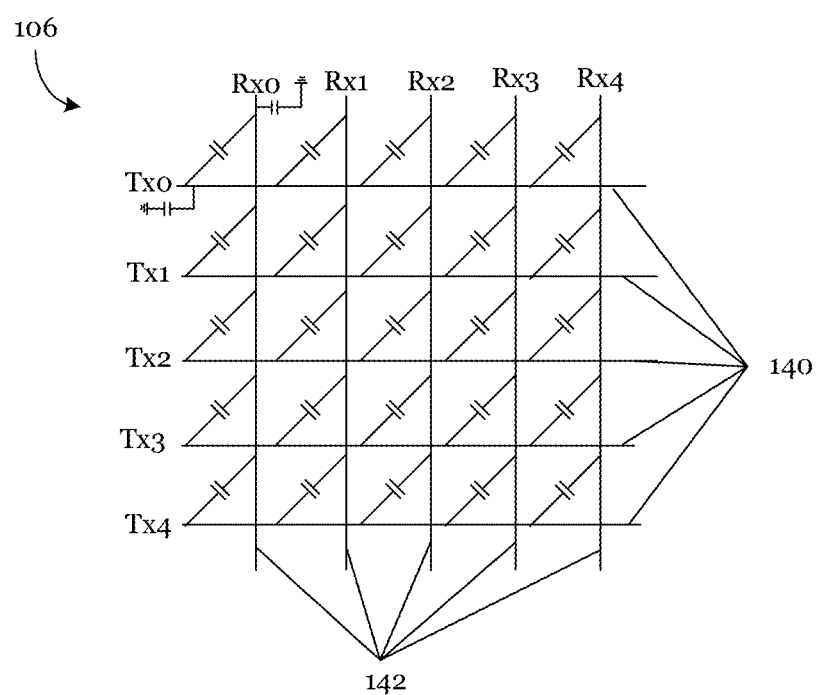

FIG. 1C illustrates two operational modes of the touch sensing layer 106. The touch sensing layer 106 may comprise TX touch sensors 140 (Tx0-Tx4) and RX touch sensors 142 (Rx0-Rx4) that span the entirety of the display panel 100 in a grid-like fashion that are operable by the touchscreen controller 124. The TX touch sensors Tx0-Tx4 and RX touch sensors Rx0-Rx4 may be coupled to the touchscreen controller 124. Although five TX touch sensors and five RX touch sensors are illustrated in FIG. 1C, this is not indicative of the number of touch sensors that may be present on the touch sensing layer 106. Any suitable number of TX and RX touch sensors may be used in the touch sensing layer.

The inventors of this application have identified that when the uplink signal 132 is transmitted by the touch sensing layer 106, an interference to the display layer 110 may cause the display flicker. Advantageously, the interference may be prevented based on the frequency of Vsync and whether the touchscreen controller 124 has detected the active stylus pen using the touch sensing layer 106.

Figure 2A:
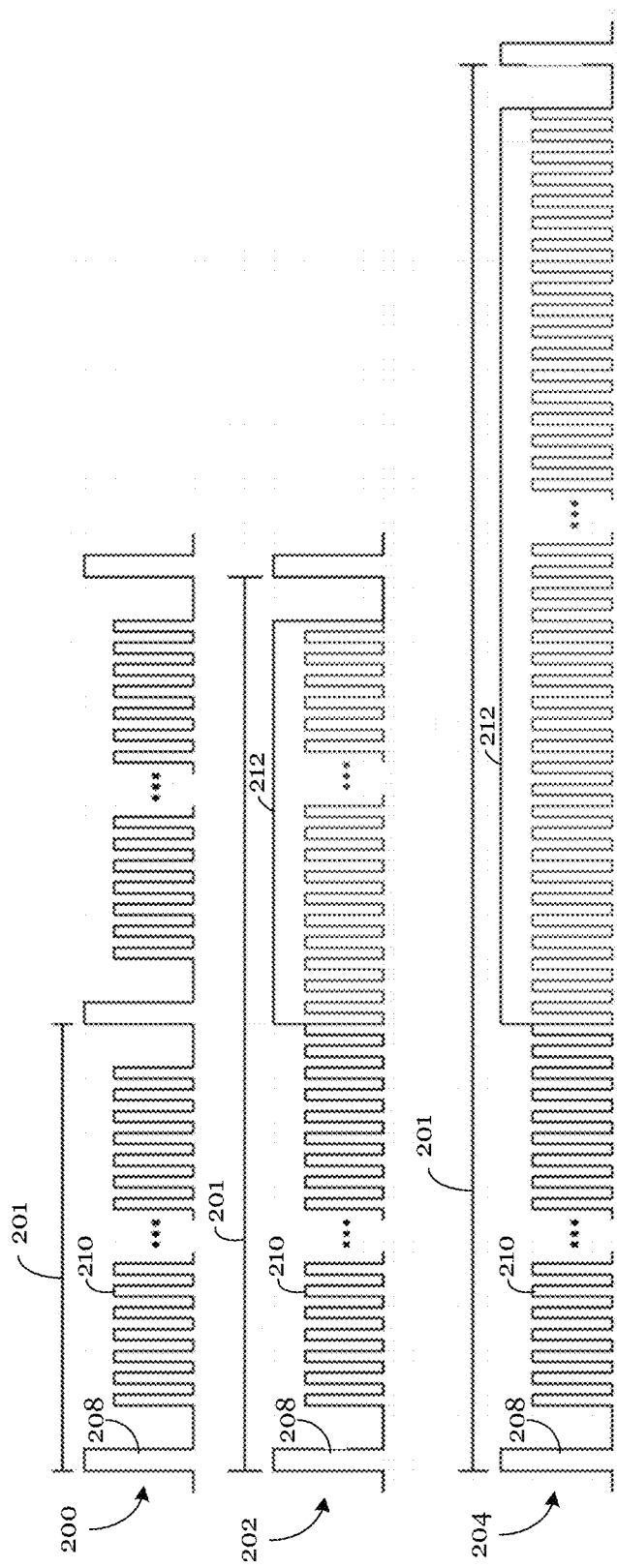
FIGS. 2A-2B illustrate timing diagrams for preventing flicker on a display according to an embodiment of the present application, where
Figure 2B:
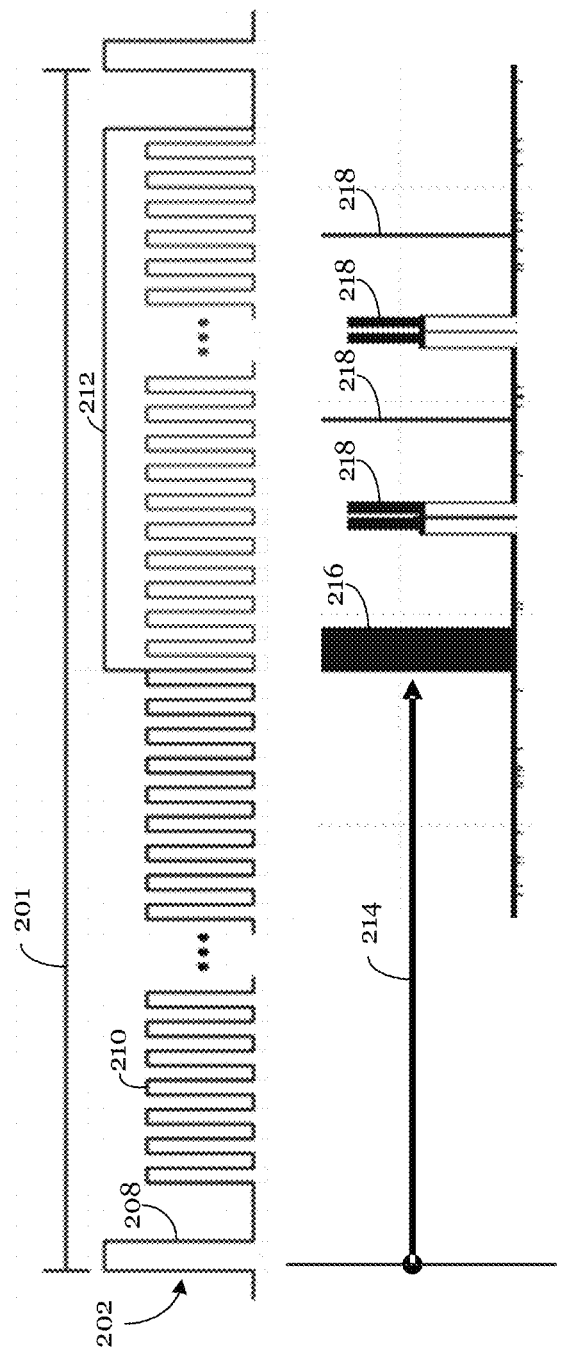

FIGS. 2A-2B illustrate timing diagrams for preventing flicker on a display according to an embodiment of the present application, where FIG. 2A illustrates a timing diagram for updating a display with variable refresh rates, and FIG. 2B illustrates a timing diagram for preventing display flicker when the touch controller transmits an uplink signal to an active stylus.

Referring to FIG. 2A, a first graph 200 illustrates a frame having a first refresh rate, a second graph 202 illustrates a frame having a second refresh rate, and a third graph 204 illustrates a frame having a third refresh rate.

As described above, the duration of time of a frame 201 is determined by the frequency of Vsync 208. Each frame 201 is distinguished when Vsync 208 is transmitted. The higher the frequency of Vsync 208, the shorter the duration of the frame 201. For example, the frequency of Vsync 208 in the first graph 200 is greater than the frequency of Vsync 208 in the second graph 202 which is greater than the frequency of Vsync 208 in the third graph 204.

Also, each horizontal line of pixels of the display panel is updated sequentially according a horizontal synchronization signal (Hsync) 210. Hsync 210 is transmitted throughout each frame 201. Thus, the frequency of Hsync 210 ensures that Hsync 210 is transmitted fast enough to update each horizontal line of the display panel sequentially before the end of the frame. In other words, the frequency of Hsync 210 ensures that Hsync 210 is transmitted for a minimum quantity of times equal to the number of horizontal lines j. For example, if j equals 100, Hsync is transmitted at least 100 times in each frame 201. If there is time remaining in the frame 201 after each data line is updated, Hsync 201 is still transmitted. However, after Hsync 210 is transmitted j times, the display driver 126 does not restart updating the horizontal lines until a next frame. Therefore, the duration of time when Hsync 210 is transmitted after each horizontal line is updated is idle time where the display maintains its updated image. The idle time may also be referred to as a dummy scan period or a scan quiet period.

Whether an idle time is present is based on the frequency of Vsync 208 and Hsync 210. For example, in the first graph 200, the duration of the frame 201 is too short for any idle time. In other words, the frequency of Vsync is too high and only allows for just enough time for the display layer 110 to be updated.

On the other hand, the frequency of Vsync 210 in the second graph 202 and the third graph 204 is low enough to allow for idle time 212.

The transmission frequency of an uplink signal may also be referred to as an uplink beacon frame rate or uplink frame frequency, which is equal to the number of uplink beacons transmitted per second. The frequency of Vsync 208 may also be referred to as a display frame frequency. In various embodiment, the uplink beacon frame rate may be fixed (e.g., 60 Hz) and the display frame frequency may be adaptively adjusted (e.g., dynamically switching between 120 Hz, 60 Hz, 30 Hz, and 10 Hz). In other embodiment, both the uplink beacon frame rate and the display frame frequency may be adjusted.

In one embodiment, the uplink beacon frame rate and the display frame frequency may be independent of each other. The uplink beam frame rate and the display frame frequency may run asynchronously.

In another embodiment, the uplink beacon frame rate may be synchronized with the display frame frequency. In other words, the uplink beacon frames may be synchronized with the display frames. In this case, transmission timing of the uplink beacon may be determined in accordance with the display frame. In the synchronized scenario, the uplink beacon frame rate may or may not be the same as the display frame frequency.

In one embodiment, an uplink signal is transmitted in each frame 201. In this case, the transmission frequency of an uplink signal is the same as Vsync 208. Advantageously, if the touchscreen controller 124 determines that there is idle time 212 in the frame 201 based on the frequencies of Vsync 208, Hsync 210, and the number of horizontal lines, the touchscreen controller 124 may synchronize the uplink signal with each frame 201 and delay transmission of the uplink signal until the idle time 212. One advantage of this is that the interference caused by the uplink signal will occur while the display layer 110 is idle, preventing flicker from occurring.

In another embodiment, the transmission frequency of an uplink signal may be larger than the frequency of Vsync 208, and thus more than one uplink signals are transmitted in each frame 201. If the touchscreen controller 124 determines that there is idle time 212 in the frame 201 based on the frequencies of Vsync 208, Hsync 210, and the number of horizontal lines, the touchscreen controller 124 may synchronize the more than one uplink signals with each frame 201 and delay transmission of the more than one uplink signals until the idle time 212.

In yet another embodiment, the frequency of Vsync 208 may be larger than the transmission frequency of an uplink signal. For example, the Vsync frequency may be 120 Hz and the uplink beacon frame rate may be 60 Hz. Depending on specific configurations of a display panel, sometimes the display panel with a 120 Hz display frame rate may still have an idle time, which is different from the graph 200 in FIG. 2A. In this case, the touchscreen controller 124 may synchronize one uplink signal with every other display frame and transmit the uplink signal during the idle time in every other display frame.

Referring to FIG. 2B, if the touchscreen controller 124 determines there is idle time 212 in the frame 201, the touchscreen controller may delay transmitting an uplink signal 216 until the idle time 212. The delay may be a duration of time 214 measured from either the rising edge of Vsync 208 or the falling edge of Vsync 208. The duration of time 214 may be a fixed duration of time based on the value of j and the frequency of Hsync 210. In addition, the touchscreen controller 124 may perform touch sensing scans 218 after transmitting the uplink signal 216. Advantageously, delaying transmission of the uplink signal 216 and touch sensing scans 218 until the idle time 212 (if any) ensures the interference does not occur while the display layer 110 is updating, preventing flicker.

Although not shown in FIG. 2B, the uplink signal 216 may not be transmitted immediately when the idle time 212 starts. There may be a delay served as a buffer between the beginning of the idle time 212 and the beginning of the uplink signal 216.

However as described above, if there is no idle time 212 in the frame, flicker cannot be avoided by transmitting the uplink signal 216 during the idle time 212. Advantageously, to neutralize the additional current draw required by the uplink signal 216, the touchscreen controller 124 may transmit uplink signals with opposite polarities based on whether the touchscreen controller 124 has detected the active stylus pen 128 using the touch sensing layer 106.

Figure 3:
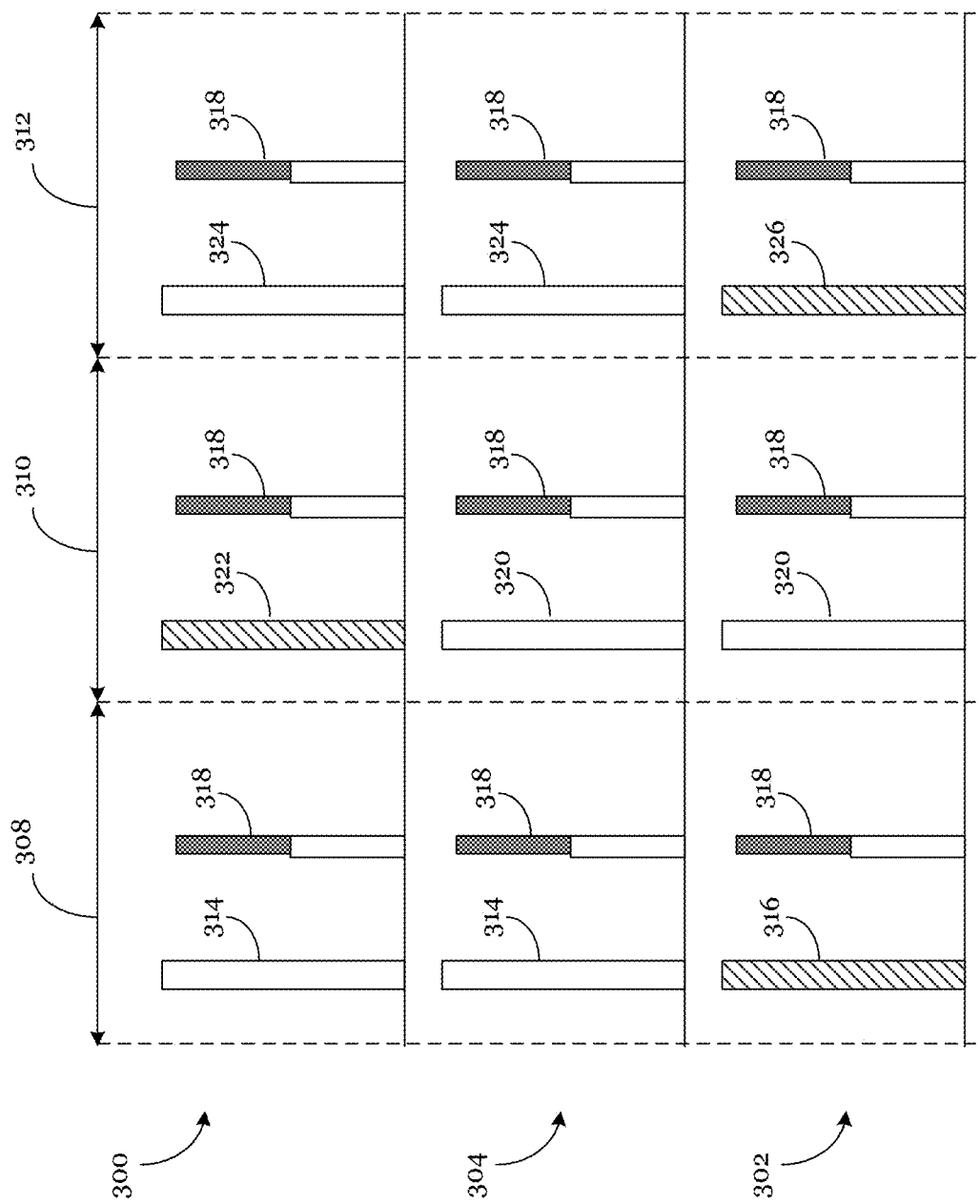
FIG. 3 illustrates timing diagrams for preventing flicker on a display when the touchscreen controller has not detected an active stylus pen according to embodiments of the present application.

FIG. 3 illustrates how the interference caused by the uplink signal transmission may be neutralized if the touchscreen controller 124 has not detected the active stylus pen 128.

As described above, an uplink signal may be transmitted from the touch sensing layer 106 in each frame regardless of whether the touchscreen controller 124 detects a downlink signal from the active stylus pen 128. This allows for the touchscreen controller 124 to continuously search for the active stylus pen 128. Due to the larger size of the touch sensing layer 106, the active stylus pen 128 may detect an uplink signal before the touch sensing layer 106 receives a downlink signal. Therefore, the touch sensing layer 106 may transmit an uplink signal prior to detecting the active stylus pen 128. Thus, regardless of whether the active stylus pen 128 is detected, an uplink signal may be transmitted.

Flicker on the display layer 110 may be reduced in each frame by limiting the number of touch sensors on the touch sensing layer 106 that transmit an uplink signal. In various embodiments, an uplink signal may only be transmitted using either only the TX touch sensors or only the RX touch sensors. Advantageously, using either the TX touch sensors or the RX touch sensors still covers the entire area of the touch sensing layer, allowing for the active stylus pen 128 to detect an uplink signal from anywhere on the display panel 100.

When the active stylus pen 128 has not been detected, the touch sensing layer 106 may be divided into different regions that transmit uplink signals of opposite polarities to reduce the interference. Each region may include consecutive TX touch sensors or RX touch sensors.

In various embodiments, the touch sensing layer 106 may be divided into a first region, a second region, and an optional third region. The first and the second regions may each include an equal number of TX touch sensors or RX touch sensors. For example, the first region of TX touch sensors may include a top half of TX touch sensors and a second region of TX touch sensors may include a bottom half of TX touch sensors. Alternatively, the RX touch sensors may be divided into a first region of RX touch sensors including a left half of consecutive RX touch sensors and a second region of RX touch sensors including a right half of consecutive RX touch sensors. For example, if the touch sensing layer 106 included ten TX touch sensors, the first region may include the first five consecutive TX touch sensors and the second region may include the second five TX touch sensors. Similarly, if the touch sensing layer 106 included ten RX touch sensors, the first region of RX touch sensors may include the first five consecutive RX touch sensors and the second region of RX touch sensors may include the second five consecutive RX touch sensors.

On the other hand, the first region of TX touch sensors (or RX touch sensors), and the second region of TX touch sensors (or RX touch sensors) may include 25%-49% of the TX touch sensors (or RX touch sensors), and a third region would include the remaining TX touch sensors (or RX touch sensors). The first region and second region of TX touch sensors (or RX touch sensors) include an equal quantity of touch sensors. The third region of either TX touch sensors or RX touch sensors may be located between the first and second regions. For example, if the touch sensing layer includes ten TX touch sensors, the first region may include the first four consecutive TX touch sensors, the third region may include the next two consecutive TX touch sensors, and the second region may comprise the next four consecutive TX touch sensors. The same may apply if RX touch sensors are used to transmit uplink signals.

As described above, in order to reduce the interference caused by the uplink signal, the first region and the second region may transmit uplink signals with opposite polarities. The uplink signals may include the same data but with opposite polarities. However, as understood by those with ordinary skill in the art, the active stylus pen 128 may only detect positive uplink (beacon) signals. For example, the active stylus pen 128 may only recognize positive beacons in Version 1 Specification of the Universal Stylus Initiative (USI) standard and may recognize both positive and negative beacons in Version 2 Specification of the USI standard. Therefore, the first region and the second region alternate between transmitting a positive and negative uplink signal in alternating frames. The third region may transmit a positive uplink signal in each frame. Advantageously, the at least half of TX touch sensors (or RX touch sensors) transmit an uplink signal detectable by the active stylus pen 128 in each frame, while negative uplink signals neutralize display flicker.

In some embodiments, an uplink signal is a binary waveform including a series of bit values represented as either a higher level voltage or a lower level voltage. Bit value "o" may be represented as a lower level, and bit value "1" may be represented as a higher level, or vice versa. The uplink signal with opposite polarity is generated by changing each lower level of the uplink signal to a higher level and each higher level of the uplink signal to a lower level. In various embodiments, an uplink signal may be a beacon signal with positive polarity generated in accordance with a Universal Stylus Initiative (USI) standard. In this case, the uplink signal with opposite polarity is the beacon signal with negative polarity.

In various embodiments, the first region may be referred to as a top region, which includes one or more TX touch sensors located on the top of the touch sensing layer. The second region may be referred to as a bottom region, which includes one or more TX touch sensors located on the bottom of the touch sensing layer. The third region may be referred to as a middle region, which includes one or more TX touch sensors located in the middle of the touch sensing layer. When the touchscreen controller has not detected the active stylus pen, the middle region may always transmit a positive uplink signal in each frame, and the other regions may transmit uplink signals with different polarities in different frames. For example, the middle region may transmit three uplink signals (a first uplink signal, a second uplink signal, and a third uplink signal) respectively in three consecutive frames (a first frame, a second frame, and a third frame). Each of the first uplink signal, the second uplink signal and the third uplink signal may be a respective beacon signal with positive polarity generated in accordance with the USI standard. The top region and the bottom region may transmit uplink signals with different polarities to neutralize display flicker. In the first frame, the top region may transmit the first uplink signal, and the bottom region may transmit the first uplink signal with opposite polarity. In the second frame, the top region may transmit the second uplink signal with opposite polarity, and the bottom region may transmit the second uplink signal. In the third frame, the top region may transmit the third uplink signal, and the bottom region may transmit the third uplink signal with opposite polarity.

In various embodiments, the first region may be referred to as a left region, which includes one or more RX touch sensors located on the left side of the touch sensing layer. The second region may be referred to as a right region, which includes one or more RX touch sensors located on the right side of the touch sensing layer. The third region may be referred to as a middle region, which includes one or more RX touch sensors located in the middle of the touch sensing layer. When the touchscreen controller has not detected the active stylus pen, the middle region may always transmit a positive uplink signal in each frame, and the other regions may transmit uplink signals with different polarities in different frames. For example, the middle region may transmit three uplink signals (a first uplink signal, a second uplink signal, and a third uplink signal) respectively in three consecutive frames (a first frame, a second frame, and a third frame). Each of the first uplink signal, the second uplink signal and the third uplink signal may be a respective beacon signal with positive polarity generated in accordance with the USI standard. The left region and the right region may transmit uplink signals with different polarities to neutralize display flicker. In the first frame, the left region may transmit the first uplink signal, and the right region may transmit the first uplink signal with opposite polarity. In the second frame, the left region may transmit the second uplink signal with opposite polarity, and the right region may transmit the second uplink signal. In the third frame, the left region may transmit the third uplink signal, and the right region may transmit the third uplink signal with opposite polarity.

Referring to FIG. 3, a first timing diagram 300 illustrates uplink signals transmitted by a first region of TX touch sensors or RX touch sensors in a first frame 308, and second frame 310, and a third frame 312. A second timing diagram 302 illustrates uplink signals transmitted by a second region of TX touch sensors or RX touch sensors in the first frame 308, the second frame 310, and the third frame 312. A third timing diagram 304 illustrates uplink signals transmitted by the third region of TX touch sensors or RX touch sensors in the first frame 308, the second frame 310, and the third frame 312.

As described above, the first region of TX touch sensors or RX touch sensors may transmit a first beacon with positive polarity 314 in the first frame 308, a second beacon with negative polarity 322 in the second frame 310, and a third beacon with positive polarity 324 in the third frame 312. The second region of TX touch sensors or RX touch sensors may transmit the first beacon with negative polarity 316 in the first frame 308, the second beacon with positive polarity 320 in the second frame 310, and the third beacon with negative polarity 326 in the third frame 312. The third region of TX touch sensors or RX touch sensors may transmit the first beacon with positive polarity 314 in the first frame 308, the second beacon with positive polarity 320 in the second frame 310, and the third beacon with positive polarity 324 in the third frame 312. Also, as described above, touch sensing signals 318 may be transmitted in each frame.

In a frame, if the active stylus pen 128 is close enough to the touch sensing layer 106 so that the touch sensing layer 106 receives a downlink signal from the active stylus pen 128, the touchscreen controller 124 may transmit uplink signals with opposite polarities to track the active stylus pen 128 while neutralizing display flicker. However, because the active stylus pen 128 may only detect the uplink signals with positive polarity (e.g., in accordance with Version 1 Specification of the USI standard as described above), the touch sensing layer may be divided into a pen zone and a non-pen zone to transmit uplink signals with both positive polarity and negative polarity to track the movement of the active stylus pen 128 while still mitigating display flicker.

FIGS. 4A-4F illustrate timing diagrams for preventing flicker on a display when the touchscreen controller has detected an active stylus pen according to embodiments of the present application.

After detecting the active stylus pen 128 by receiving a downlink signal from the active stylus pen 128, the touchscreen controller 124 may divide the touch sensing layer 106 into different areas such as a pen zone and a non-pen zone. The pen zone may include a TX touch sensor and a RX touch sensor associated with a current location of the active stylus pen. The TX touch sensor and the RX touch sensor associated with the current location of the active stylus pen may receive a strongest downlink signal transmitted by the active stylus pen. The pen zone may further include a fixed quantity of TX touch sensors and a fixed quantity of RX touch sensors that neighbor the TX touch sensor and the RX touch sensor associated with the current location of the active stylus pen. The non-pen zone may include the plurality of touch sensors of the touch sensing layer excluding the pen zone. To track the movement of the active stylus pen 128, the pen zone may include an equal number of TX touch sensors and the RX touch sensors on both sides of the current pen location. Alternatively, the pen zone may include an unequal quantity of TX touch sensors and the RX touch sensors on each side of the current pen location.

Figure 4A:
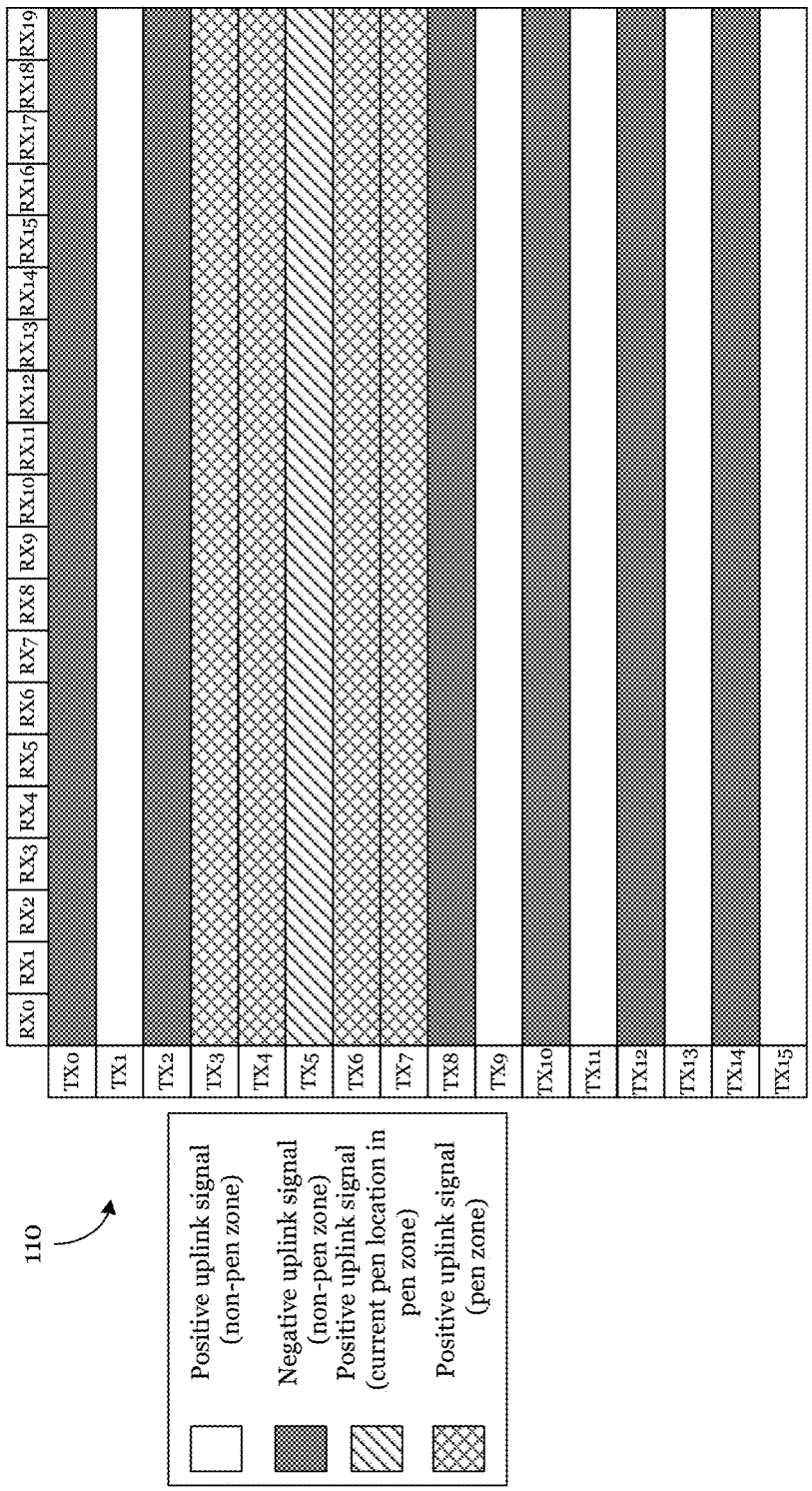
FIGS. 4A-4F illustrate timing diagrams for preventing flicker on a display when the touchscreen controller has detected an active stylus pen according to embodiments of the present application.

FIG. 4A illustrates TX touch sensors Tx0-Tx15 of the touch sensing layer that are divided into a pen zone and a non-pen zone. Although the touch sensing layer 106 has sixteen TX touch sensors, this is for example purposes only. Any sufficient quantity of TX touch sensors may be included in the touch sensing layer.

For example, the TX touch sensor Tx5 may receive the strongest downlink signal from the active stylus pen 128, and thus is referred to as the current pen location. The pen zone may include the TX touch sensor Tx5. The pen zone may further include two TX touch sensors on each side of Tx5. In other words, the pen zone may include Tx3, Tx4, Tx5, Tx6, and Tx7.

As explained above, because the active stylus pen 128 may only detect uplink signals with a positive polarity, each TX touch sensor in the pen zone may transmit an uplink signal with positive polarity to track the handwriting or drawing of a user.

On the other hand, the non-pen zone may include the TX touch sensors that are not in the pen zone. For example, the non-pen zone may include Tx0-Tx2 and Tx8-Tx15. To neutralize display flicker caused by transmitting the uplink signal, the non-pen zone may alternate between transmitting a positive uplink signal (an uplink signal with positive polarity) and a negative uplink signal (an uplink signal with negative polarity).

In various embodiments, the TX touch sensors that are in the non-pen zone may alternate between transmitting a positive and negative uplink signal. In other words, in the non-pen zone, TX touch sensors that transmit a positive uplink signal may interleave with TX touch sensors that transmit a negative uplink signal. For example, the TX touch sensors in the non-pen zone that border the pen zone may transmit a negative uplink signal. Then, each TX touch sensor may alternate between a positive and negative uplink signal. In various embodiments, any suitable dynamic pattern may be applied to the non-pen zone. For example, Tx2 may transmit a negative uplink signal. Then, moving away from the pen zone, the TX touch sensors may alternate between transmitting a positive and negative uplink signal. For example, Tx1 may transmit a positive uplink signal, and Tx0 may transmit a negative uplink signal. Similarly, Tx8, Tx10, Tx12, and Tx14 may transmit negative uplink signals while Tx9, Tx11, Tx12, and Tx15, transmit positive uplink signals. Of course, Tx3-Tx7 each transmit a positive uplink signal.

Figure 4B:
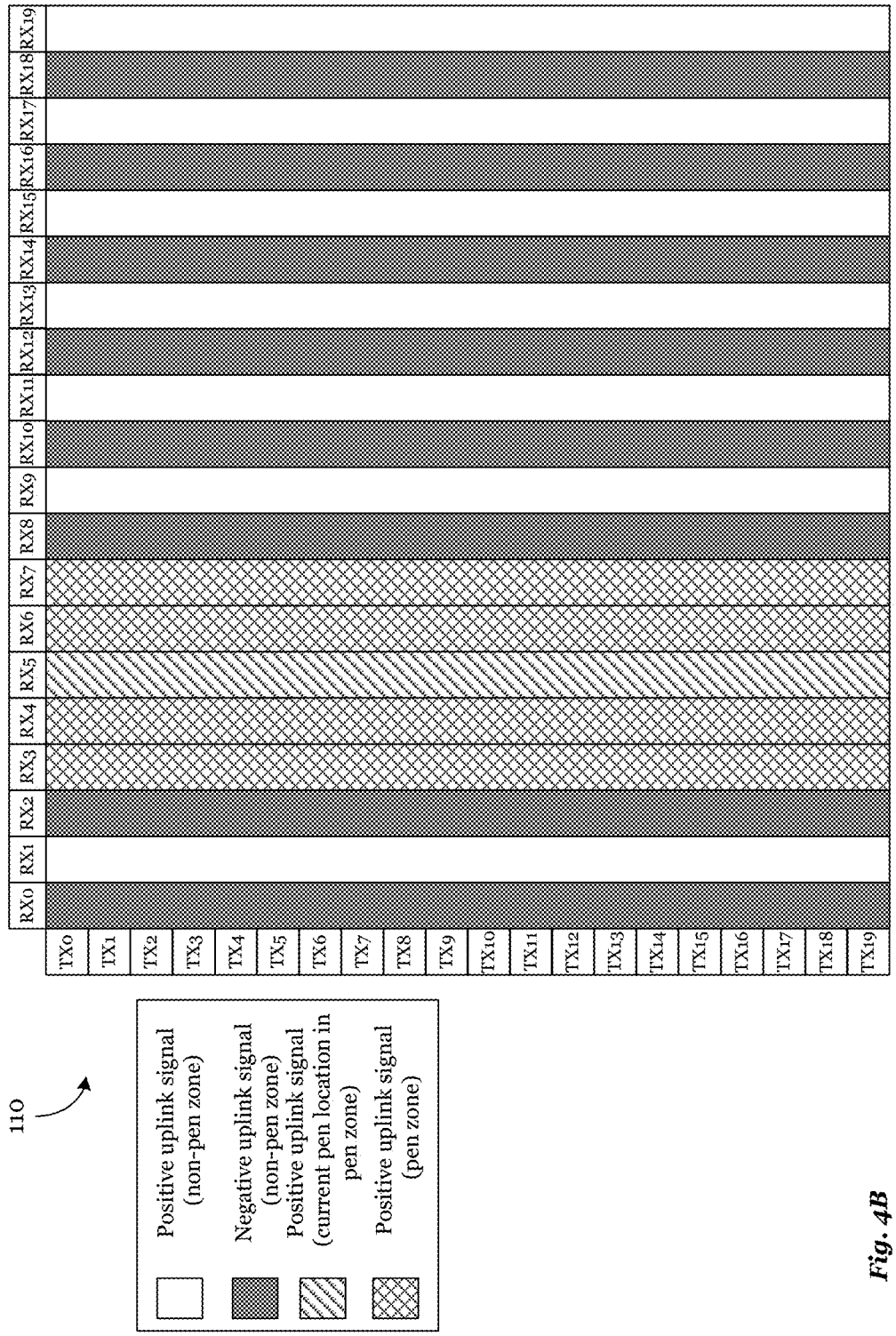

FIG. 4B illustrates RX touch sensors Rx0-Rx19 of the touch sensing layer that also are divided into a pen zone and a non-pen zone. Although the touch sensing layer 106 has twenty RX touch sensors, this is for example purposes only. Any sufficient quantity of RX touch sensors may be included in the touch sensing layer.

The RX touch sensors of the touch sensing layer may be divided in the same manner as the TX touch sensors. For example, the RX touch sensor Rx5 may receive the strongest downlink signal from the active stylus pen 128. Thus, Rx5 is the current pen location, and the pen zone may include Rx5. The pen zone may further include two RX touch sensors on each side of the current pen location. In other words, the pen zone may include Rx3, Rx4, Rx5, Rx6, and Rx7.

Furthermore, the non-pen zone may include the RX touch sensors that are not included in the pen zone. For example, the pen sensing area may include Rx0-Rx2 and Rx8-Rx19.

The RX touch sensors may transmit positive and negative uplink signals in the same manner of the TX touch sensors, and concurrently with the RX touch sensors. For example, RX touch sensors Rx0, Rx2, Rx8, Rx10, Rx 12, Rx 14, Rx16, and Rx18 may transmit a negative uplink signal. RX touch sensors Rx1, Rx9, Rx11, Rx13, Rx15, Rx17, and Rx19 may each transmit a positive uplink signal. RX touch sensors Rx3-Rx7 may each transmit and positive uplink signal by virtue of being within the pen zone.

Figure 4C:
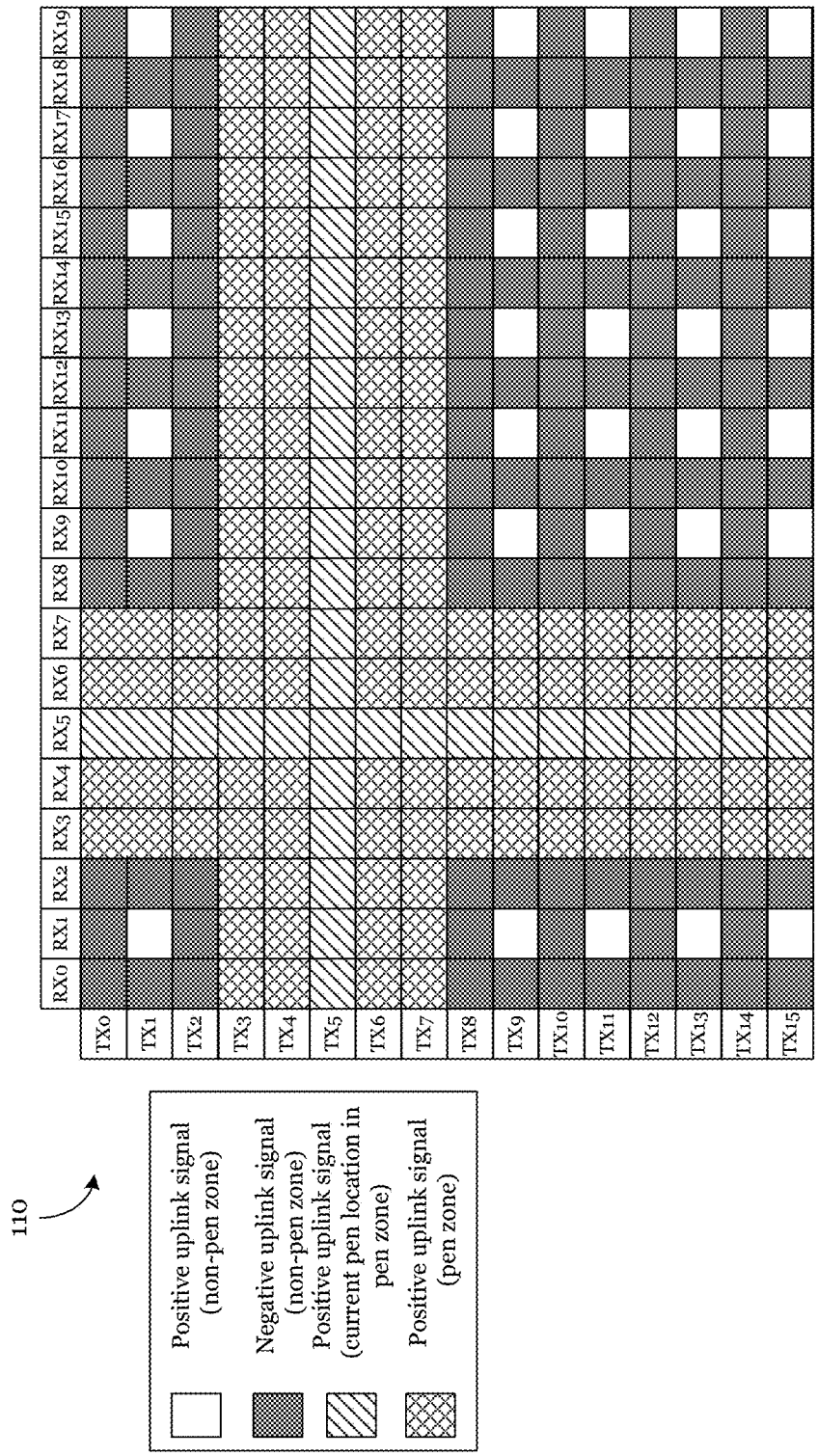

FIG. 4C illustrates the combination of the TX touch sensors and RX touch sensors transmitting the uplink signals in the manner discussed in FIGS. 4A and 4B.

On the other hand, in order to reduce the interference when the touch sensing layer 106 is detecting the active stylus pen 128, each TX touch sensor and RX touch sensor in the non-pen zone may transmit a negative uplink signal.

Figure 4D:
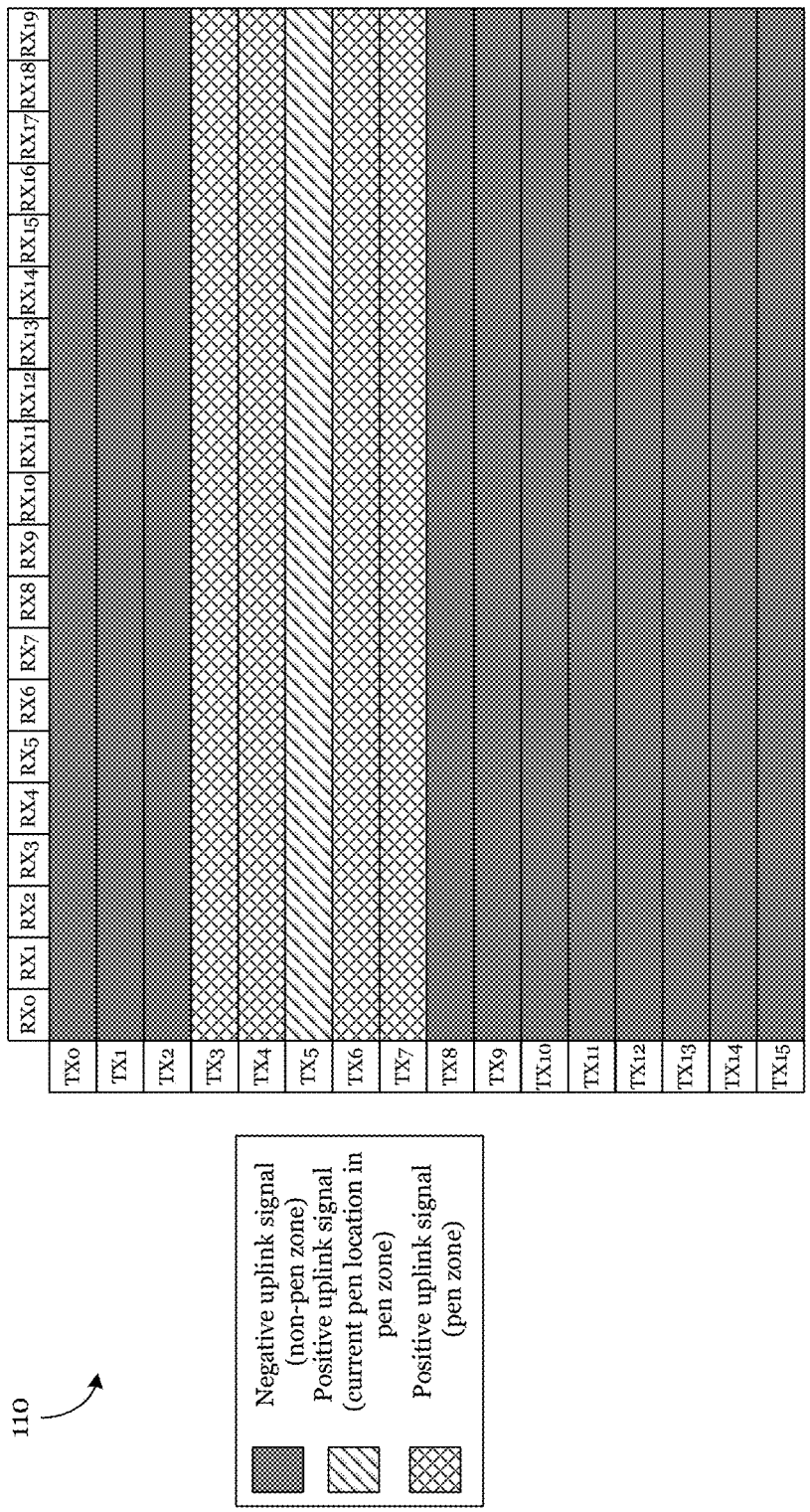
Figure 4E:
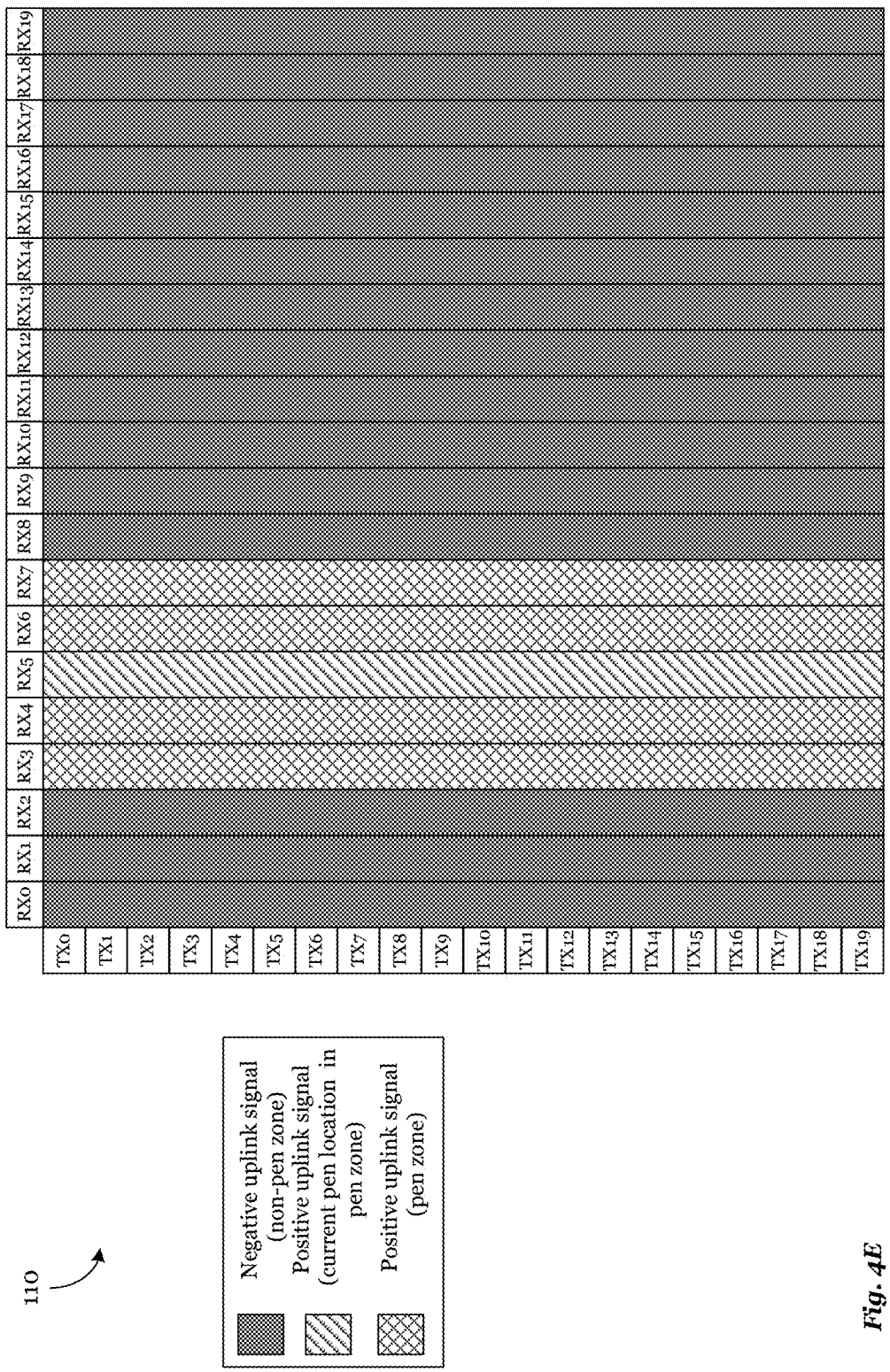
Figure 4F:
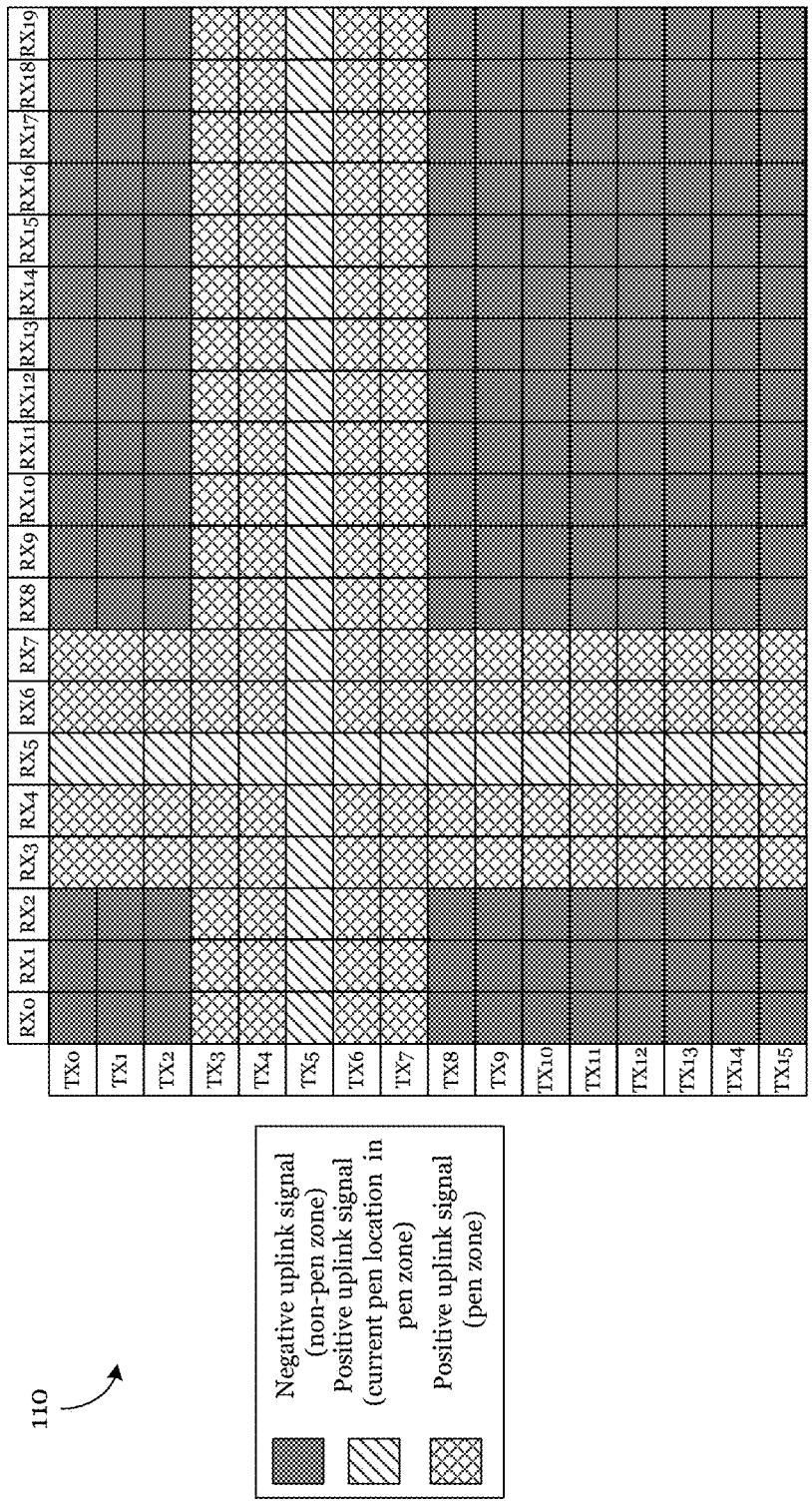

Referring to FIGS. 4D-4F, each TX touch sensor and RX touch sensor in the non-pen zone may transmit a negative uplink signal while the TX touch sensors and RX touch sensors that are within the pen zone each transmit the positive uplink signal.

For example, TX touch sensors Tx0-Tx2 and Tx8-Tx15 may transmit a negative uplink signal and TX touch sensors Tx3-Tx7 each transmit a positive uplink signal. Similarly, as shown in FIG. 4E, RX touch sensors Rx0-Rx2 and Rx8-Rx19 may transmit a negative uplink signal and RX touch sensors Rx3-Rx7 each transmit a positive uplink signal.

Figure 5:
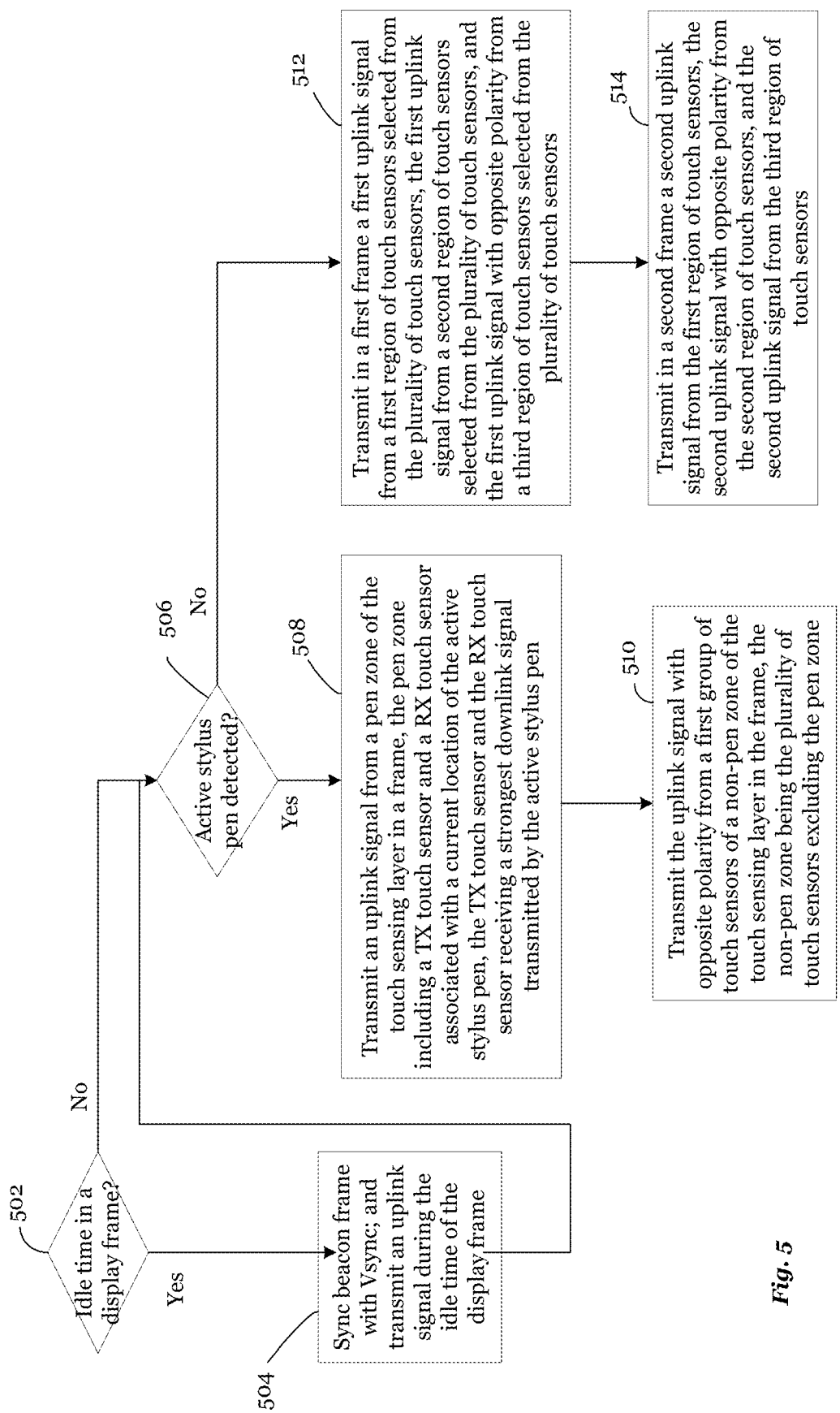
FIG. 5 illustrates a process flow for preventing flicker on a display according to an embodiment of the present application.

FIG. 5 illustrates a process flow for preventing flicker on a display according to an embodiment of the present application.

As illustrated in block 502 and described with reference to FIGS. 2A-2B the touchscreen controller 124 determines whether idle time 212 is present in the display frame 201. If idle time is present in the display frame, the method proceeds to block 504, and the touchscreen controller transmits an uplink signal 216 within the idle time 212 of the frame 201. In this case, the touch controller 124 may synchronize beacon frames with display frames. There may be a fixed delay between each beacon frame and display frame. On the other hand, if the touchscreen controller 124 determines that idle time 212 is not present in the display frame, the method proceeds to block 506.

As next illustrated in block 502, and described with reference to FIG. 3, and FIGS. 4A-4F, if the touchscreen controller 124 determines that idle time 212 is not present in the frame 201, the touchscreen controller 124 may try to detect the active stylus pen 128. The touchscreen controller 124 may determine that the active stylus pen 128 is detected, if the touch sensing layer 106 receives a downlink signal from the active stylus pen 128. If the touch touchscreen controller 124 has detected the active stylus pen 128, the method proceeds to blocks 508 and 510.

As next illustrated in block 508, the touchscreen controller 124 may transmit an uplink signal from a pen zone of the touch sensing layer in a frame, the pen zone including a TX touch sensor and a RX touch sensor associated with a current location of the active stylus pen, the TX touch sensor and the RX touch sensor receiving a strongest downlink signal transmitted by the active stylus pen.

As illustrated in block 510, the touchscreen controller may transmit the uplink signal with opposite polarity from a first group of touch sensors of a non-pen zone of the touch sensing layer in the frame, the non-pen zone being the plurality of touch sensors excluding the pen zone.

The uplink signal transmission in block 508 and block 510 may be performed in the same manner described in FIGS. 4A-4F.

On the other hand, if the touchscreen controller has not detected the active stylus pen, the method continues to block 512 and block 514.

As next illustrated in block 512, the touchscreen controller may transmit in a first frame a first uplink signal from a first region of touch sensors selected from the plurality of touch sensors, the first uplink signal from a second region of touch sensors selected from the plurality of touch sensors, and the first uplink signal with opposite polarity from a third region of touch sensors selected from the plurality of touch sensors.

As illustrated in block 512, the touchscreen controller may transmit in a second frame a second uplink signal from the first region of touch sensors, the second uplink signal with opposite polarity from the second region of touch sensors, and the second uplink signal from the third region of touch sensors.

In one embodiment, the block 504 may solve the flicker issue and the method may not go to other blocks. In another embodiment, even after the block 504 is performed, extra safeguards may still be needed to reduce the interference that causes the display flicker. This may occur especially when the display panel is switching the display refresh rate. In this case, the method may go from the block 504 to the block 506. Thus, the block 508 and block 510 will be performed when the active stylus pen is detected, and the block 512 and the block 514 will be performed when the active stylus pen is not detected.

Example embodiments of the invention are summarized here. Other embodiments can also be understood from the entirety of the specification as well as the claims filed herein.

Example 1. A method for operating an electronic device, the method comprising: determining, by a touchscreen controller, based on a frequency of a vertical synchronization signal (Vsync), whether a first display frame includes an idle time, the idle time being a duration of time remaining in the first display frame after an image displayed on a display of the electronic device is updated during the first display frame; and in response to determining that the first display frame includes the idle time, transmitting, by the touchscreen controller, an uplink signal in the first display frame, the uplink signal being transmitted during the idle time of the first display frame.

Example 2. The method of Example 1, wherein the uplink signal is a beacon signal, and wherein an uplink beacon frame rate of the beacon signal is either the same or different from a frequency of the Vsync.

Example 3. The methods of Example 1 and Example 2, wherein a frequency of Vsync is dynamically changed.

Example 4. The methods of Example 1 through Example 3, wherein the touchscreen controller transmits the uplink signal using transmitting (TX) touch sensors, or receiving (RX) touch sensors, or both the TX touch sensors and the RX touch sensors.

Example 5. The methods of Example 1 through Example 4, wherein the TX touch sensors are arranged in rows across a touch sensing layer of the display and the RX touch sensors are arranged in columns across the touch sensing layer.

Example 6. The methods of Example 1 through Example 5, wherein the TX touch sensors are arranged in columns across a touch sensing layer of the display and the RX touch sensors are arranged in rows across the touch sensing layer.

Example 7. The methods of Example 1 through Example 6, wherein the display is a Youm On-Cell Touch Active-Matrix Organic Light Emitting Diode (YOCTA) display or a Foldable On-Cell Touch Active-Matrix Organic Light Emitting Diode (FOCTA) display.

Example 8. A method for operating an electronic device, the method comprising: detecting, by a touchscreen controller, an active stylus pen, the touchscreen controller coupled to a touch sensing layer of a display of the electronic device, the touch sensing layer comprising a plurality of touch sensors including transmitting (TX) touch sensors arranged in rows across the touch sensing layer and receiving (RX) touch sensors arranged in columns across the touch sensing layer; in response to determining that the touchscreen controller has not detected the active stylus pen, transmitting in a first display frame a first uplink signal from a first region of the touch sensing layer, the first uplink signal from a second region of the touch sensing layer, and the first uplink signal with opposite polarity from a third region of the touch sensing layer; and in response to determining that the touchscreen controller has not detected the active stylus pen, transmitting in a second display frame a second uplink signal from the first region of the touch sensing layer, the second uplink signal with opposite polarity from the second region of the touch sensing layer, and the second uplink signal from the third region of the touch sensing layer.

Example 9. The method of Example 8, wherein the first uplink signal is a first binary waveform, wherein the first uplink signal with opposite polarity is generated by changing each lower level of the first uplink signal to a higher level and each higher level of the first uplink signal to a lower level, wherein the second uplink signal is a second binary waveform, and wherein the second uplink signal with opposite polarity is generated by changing each lower level of the second uplink signal to a higher level and each higher level of the second uplink signal to a lower level.

Example 10. The methods of Example 8 and Example 9, wherein the first uplink signal is a first beacon signal with positive polarity generated in accordance with a Universal Stylus Initiative (USI) standard, and wherein the second uplink signal is a second beacon signal with positive polarity generated in accordance with the USI standard.

Example 11. The methods of Example 8 through Example 10, further comprising: in response to determining that the touchscreen controller has not detected the active stylus, transmitting in a third display frame a third uplink signal from the first region of the touch sensing layer, the third uplink signal from the second region of the touch sensing layer, and the third uplink signal with opposite polarity from the third region of the touch sensing layer.

Example 12. The methods of Example 8 through Example 11, wherein the first region of the touch sensing layer includes one or more TX touch sensors located in the middle of the touch sensing layer, wherein the second region of the touch sensing layer includes one or more TX touch sensors located on the top of the touch sensing layer, and wherein the third region of the touch sensing layer includes one or more TX touch sensors located on the bottom of the touch sensing layer.

Example 13. The methods of Example 8 through Example 12, wherein the first region of the touch sensing layer includes one or more RX touch sensors located in the middle of the touch sensing layer, wherein the second region of the touch sensing layer includes one or more RX touch sensors located on the left side of the touch sensing layer, and wherein the third region of the touch sensing layer includes one or more RX touch sensors located on the right side of the touch sensing layer.

Example 14. The methods of Example 8 through Example 13, wherein the second region of the touch sensing layer and the third region of the touch sensing layer have the same number of touch sensors.

Example 15. The methods of Example 8 through Example 14, wherein detecting the active stylus pen comprises determining whether the touchscreen controller receives a downlink signal transmitted by the active stylus pen.

Example 16. The methods of Example 8 through Example 15, wherein the first display frame and the second display frame do not include an idle time, the idle time being a duration of time remaining in each frame after an image displayed on the display is updated.

Example 17. The methods of Example 8 through Example 16, wherein the first display frame and the second display frame both include an idle time, the idle time being a duration of time remaining in each frame after an image displayed on the display is updated, wherein uplink signals in the first display frame are transmitted during the idle time in the first display frame, and wherein uplink signals in the second display frame are transmitted during the idle time in the second display frame.

Example 18. A method for operating an electronic device, the method comprising: detecting, by a touchscreen controller, an active stylus pen, the touchscreen controller coupled to a touch sensing layer of a display of the electronic device, the touch sensing layer comprising a plurality of touch sensors including transmitting (TX) touch sensors arranged in rows across the touch sensing layer and receiving (RX) touch sensors arranged in columns across the touch sensing layer; in response to determining that the touchscreen controller has detected the active stylus pen, transmitting, by the touchscreen controller, an uplink signal from a pen zone of the touch sensing layer in a frame, the pen zone including a TX touch sensor and a RX touch sensor associated with a current location of the active stylus pen, the TX touch sensor and the RX touch sensor receiving a strongest downlink signal transmitted by the active stylus pen; and in response to determining that the touchscreen controller has detected the active stylus pen, transmitting, by the touchscreen controller, the uplink signal with opposite polarity from a first group of touch sensors of a non-pen zone of the touch sensing layer in the frame, the non-pen zone being the plurality of touch sensors excluding the pen zone.

Example 19. The method of Example 18, further comprising: transmitting the uplink signal from a second group of touch sensors of the non-pen zone in the frame, TX touch sensors in the first group of touch sensors interleaved with TX touch sensors in the second group of touch sensors, RX touch sensors in the first group of touch sensors interleaved with RX touch sensors in the second group of touch sensor.

Example 20. The methods of Example 18 and Example 19, wherein the frame does not include an idle time, the idle time being a duration of time remaining in the frame after an image displayed on the display is updated.

Example 21. The methods of Example 18 through Example 20, wherein the frame includes an idle time, the idle time being a duration of time remaining in the frame after an image displayed on the display is updated, and wherein the uplink signal and the uplink signal with opposite polarity being transmitted during the idle time.

Example 22. The methods of Example 18 through Example 21, wherein the uplink signal is a beacon signal with positive polarity generated in accordance with a Universal Stylus Initiative (USI) standard.

Example 23. The methods of Example 18 through Example 22, wherein the pen zone comprises a fixed quantity of TX touch sensors and a fixed quantity of RX touch sensors that neighbor the TX touch sensor and the RX touch sensor that receive the strongest downlink signal.

Example 24. The methods of Example 18 through Example 23, wherein TX touch sensors and RX touch sensors in the non-pen zone that border the pen zone transmit the uplink signal.

Example 25. A touchscreen controller comprising: a memory for storing a program to be executed in the touch controller, the program comprising instructions when executed cause the touch controller to: determine based on a frequency of a vertical synchronization signal (Vsync), whether a first display frame includes an idle time, the idle time being a duration of time remaining in the first display frame after an image displayed on a display of the electronic device is updated during the first display frame; and in response to determining that the first display frame includes the idle time, transmit an uplink signal in the first display frame, the uplink signal being transmitted during the idle time of the first display frame.

Example 26. The touchscreen controller of Example 25, wherein the uplink signal is a beacon signal, and wherein an uplink beacon frame rate of the beacon signal is either the same or different from a frequency of the Vsync.

Example 27. The touchscreen controllers of Example 25 and Example 26, wherein a frequency of Vsync is dynamically changed.

Example 28. The touchscreen controllers of Example 25 through Example 27, wherein the touchscreen controller transmits the uplink signal using transmitting (TX) touch sensors, or receiving (RX) touch sensors, or both the TX touch sensors and the RX touch sensors.

Example 29. The touchscreen controllers of Example 25 through Example 28, wherein the TX touch sensors are arranged in rows across a touch sensing layer of the display and the RX touch sensors are arranged in columns across the touch sensing layer.

Example 30. The touchscreen controllers of Example 25 through Example 29, wherein the TX touch sensors are arranged in columns across a touch sensing layer of the display and the RX touch sensors are arranged in rows across the touch sensing layer.

Example 31. The touchscreen controllers of Example 25 through Example 30, wherein the display is a Youm On-Cell Touch Active-Matrix Organic Light Emitting Diode (YOCTA) display or a Foldable On-Cell Touch Active-Matrix Organic Light Emitting Diode (FOCTA) display.

Example 32. A touchscreen controller comprising: a memory for storing a program to be executed in the touch controller, the program comprising instructions when executed cause the touch controller to: detect an active stylus pen, the touchscreen controller coupled to a touch sensing layer of a display of an electronic device, the touch sensing layer comprising a plurality of touch sensors including transmitting (TX) touch sensors arranged in rows across the touch sensing layer and receiving (RX) touch sensors arranged in columns across the touch sensing layer; in response to determining that the touchscreen controller has not detected the active stylus pen, transmit in a first display frame a first uplink signal from a first region of the touch sensing layer, the first uplink signal from a second region of the touch sensing layer, and the first uplink signal with opposite polarity from a third region of the touch sensing layer; and in response to determining that the touchscreen controller has not detected the active stylus pen, transmit in a second display frame a second uplink signal from the first region of the touch sensing layer, the second uplink signal with opposite polarity from the second region of the touch sensing layer, and the second uplink signal from the third region of the touch sensing layer.

Example 33. The touchscreen controller of Example 32, wherein the first uplink signal is a first binary waveform, wherein the first uplink signal with opposite polarity is generated by changing each lower level of the first uplink signal to a higher level and each higher level of the first uplink signal to a lower level, wherein the second uplink signal is a second binary waveform, and wherein the second uplink signal with opposite polarity is generated by changing each lower level of the second uplink signal to a higher level and each higher level of the second uplink signal to a lower level.

Example 34. The touchscreen controllers of Example 32 and Example 33, wherein the first uplink signal is a first beacon signal with positive polarity generated in accordance with a Universal Stylus Initiative (USI) standard, and wherein the second uplink signal is a second beacon signal with positive polarity generated in accordance with the USI standard.

Example 35. The touchscreen controllers of Example 32 through Example 34, wherein in response to determining that the touchscreen controller has not detected the active stylus, the touchscreen controller transmits in a third display frame a third uplink signal from the first region of the touch sensing layer, the third uplink signal from the second region of the touch sensing layer, and the third uplink signal with opposite polarity from the third region of the touch sensing layer.

Example 36. The touchscreen controllers of Example 32 through Example 35, wherein the first region of the touch sensing layer includes one or more TX touch sensors located in the middle of the touch sensing layer, wherein the second region of the touch sensing layer includes one or more TX touch sensors located on the top of the touch sensing layer, and wherein the third region of the touch sensing layer includes one or more TX touch sensors located on the bottom of the touch sensing layer.

Example 37. The touchscreen controllers of Example 32 through Example 36, wherein the first region of the touch sensing layer includes one or more RX touch sensors located in the middle of the touch sensing layer, wherein the second region of the touch sensing layer includes one or more RX touch sensors located on the left side of the touch sensing layer, and wherein the third region of the touch sensing layer includes one or more RX touch sensors located on the right side of the touch sensing layer.

Example 38. The touchscreen controllers of Example 32 through Example 37, wherein the second region of the touch sensing layer and the third region of the touch sensing layer have the same number of touch sensors.

Example 39. The touchscreen controllers of Example 32 through Example 38, wherein detecting the active stylus pen comprises determining whether the touchscreen controller receives a downlink signal transmitted by the active stylus pen.

Example 40. The touchscreen controllers of Example 32 through Example 39, wherein the first display frame and the second display frame do not include an idle time, the idle time being a duration of time remaining in each frame after an image displayed on the display is updated.

Example 41. The touchscreen controllers of Example 32 through Example 40, wherein the first display frame and the second display frame both include an idle time, the idle time being a duration of time remaining in each frame after an image displayed on the display is updated, wherein uplink signals in the first display frame are transmitted during the idle time in the first display frame, and wherein uplink signals in the second display frame are transmitted during the idle time in the second display frame.

Example 42. A touchscreen controller comprising: a memory for storing a program to be executed in the touch controller, the program comprising instructions when executed cause the touch controller to: detect an active stylus pen, the touchscreen controller coupled to a touch sensing layer of a display of an electronic device, the touch sensing layer comprising a plurality of touch sensors including transmitting (TX) touch sensors arranged in rows across the touch sensing layer and receiving (RX) touch sensors arranged in columns across the touch sensing layer; in response to determining that the touchscreen controller has detected the active stylus pen, transmit an uplink signal from a pen zone of the touch sensing layer in a frame, the pen zone including a TX touch sensor and a RX touch sensor associated with a current location of the active stylus pen, the TX touch sensor and the RX touch sensor receiving a strongest downlink signal transmitted by the active stylus pen; and in response to determining that the touchscreen controller has detected the active stylus pen, transmit the uplink signal with opposite polarity from a first group of touch sensors of a non-pen zone of the touch sensing layer in the frame, the non-pen zone being the plurality of touch sensors excluding the pen zone.

Example 43. The touchscreen controller of Example 42, wherein the touchscreen controller transmits the uplink signal from a second group of touch sensors of the non-pen zone in the frame, TX touch sensors in the first group of touch sensors interleaved with TX touch sensors in the second group of touch sensors, RX touch sensors in the first group of touch sensors interleaved with RX touch sensors in the second group of touch sensor.

Example 44. The touchscreen controllers of Example 42 and Example 43, wherein the frame does not include an idle time, the idle time being a duration of time remaining in the frame after an image displayed on the display is updated.

Example 45. The touchscreen controllers of Example 42 through Example 44, wherein the frame includes an idle time, the idle time being a duration of time remaining in the frame after an image displayed on the display is updated, and wherein the uplink signal and the uplink signal with opposite polarity being transmitted during the idle time.

Example 46. The touchscreen controllers of Example 42 through Example 45, wherein the uplink signal is a beacon signal with positive polarity generated in accordance with a Universal Stylus Initiative (USI) standard.

Example 47. The touchscreen controllers of Example 42 through Example 46, wherein the pen zone comprises a fixed quantity of TX touch sensors and a fixed quantity of RX touch sensors that neighbor the TX touch sensor and the RX touch sensor that receive the strongest downlink signal.

Example 48. The touchscreen controllers of Example 42 through Example 47, wherein TX touch sensors and RX touch sensors in the non-pen zone that border the pen zone transmit the uplink signal.

Example 49. A device comprising: a display panel including a display layer and a touch sensing layer; a display driver; and a touchscreen controller coupled to the touch sensing layer, the touchscreen controller comprising a memory for storing a program to be executed in the touchscreen controller, the program comprising instructions when executed cause the touchscreen controller to: determine, based on a frequency of a vertical synchronization signal (Vsync), whether a first display frame includes an idle time, the idle time being a duration of time remaining in the first display frame after an image displayed on a display of the electronic device is updated during the first display frame; and in response to determining that the first display frame includes the idle time, transmit an uplink signal in the first display frame, the uplink signal being transmitted during the idle time of the first display frame.

Example 50. A device comprising: a display panel including a display layer and a touch sensing layer, the touch sensing layer comprising a plurality of touch sensors including transmitting (TX) touch sensors arranged in rows across the touch sensing layer and receiving (RX) touch sensors arranged in columns across the touch sensing layer; an active stylus pen; a display driver; and a touchscreen controller coupled to the touch sensing layer, the touchscreen controller comprising a memory for storing a program to be executed in the touchscreen controller, the program comprising instructions when executed cause the touchscreen controller to: detect the active stylus pen; in response to determining that the touchscreen controller has not detected the active stylus pen, transmit in a first display frame a first uplink signal from a first region of the touch sensing layer, the first uplink signal from a second region of the touch sensing layer, and the first uplink signal with opposite polarity from a third region of the touch sensing layer; and in response to determining that the touchscreen controller has not detected the active stylus pen, transmit in a second display frame a second uplink signal from the first region of the touch sensing layer, the second uplink signal with opposite polarity from the second region of the touch sensing layer, and the second uplink signal from the third region of the touch sensing layer.

Example 51. A device comprising: a display panel including a display layer and a touch sensing layer, the touch sensing layer comprising a plurality of touch sensors including transmitting (TX) touch sensors arranged in rows across the touch sensing layer and receiving (RX) touch sensors arranged in columns across the touch sensing layer; an active stylus pen; a display driver; and a touchscreen controller coupled to the touch sensing layer, the touchscreen controller comprising a memory for storing a program to be executed in the touchscreen controller, the program comprising instructions when executed cause the touchscreen controller to: detect the active stylus pen; in response to determining that the touchscreen controller has detected the active stylus pen, transmit an uplink signal from a pen zone of the touch sensing layer in a frame, the pen zone including a TX touch sensor and a RX touch sensor associated with a current location of the active stylus pen, the TX touch sensor and the RX touch sensor receiving a strongest downlink signal transmitted by the active stylus pen; and in response to determining that the touchscreen controller has detected the active stylus pen, transmit the uplink signal with opposite polarity from a first group of touch sensors of a non-pen zone of the touch sensing layer in the frame, the non-pen zone being the plurality of touch sensors excluding the pen zone.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for operating an electronic device, the method comprising:
   determining, by a touchscreen controller, based on a frequency of a vertical synchronization signal (Vsync), whether a first display frame includes an idle time, the idle time being a duration of time remaining in the first display frame after an image displayed on a display of the electronic device is updated during the first display frame; and
   in response to determining that the first display frame includes the idle time, transmitting, by the touchscreen controller, an uplink signal in the first display frame, the uplink signal being transmitted during the idle time of the first display frame.

2. The method of claim 1, wherein the uplink signal is a beacon signal, and wherein an uplink beacon frame rate of the beacon signal is either the same or different from a frequency of the Vsync.

3. The method of claim 1, wherein a frequency of Vsync is dynamically changed.

4. The method of claim 1, wherein the touchscreen controller transmits the uplink signal using transmitting (TX) touch sensors, or receiving (RX) touch sensors, or both the TX touch sensors and the RX touch sensors.

5. The method of claim 4, wherein the TX touch sensors are arranged in rows across a touch sensing layer of the display and the RX touch sensors are arranged in columns across the touch sensing layer.

6. The method of claim 4, wherein the TX touch sensors are arranged in columns across a touch sensing layer of the display and the RX touch sensors are arranged in rows across the touch sensing layer.

7. The method of claim 1, wherein the display is a Youm On-Cell Touch Active-Matrix Organic Light Emitting Diode (YOCTA) display or a Foldable On-Cell Touch Active-Matrix Organic Light Emitting Diode (FOCTA) display.

8. A method for operating an electronic device, the method comprising:
  detecting, by a touchscreen controller, an active stylus pen, the touchscreen controller coupled to a touch sensing layer of a display of the electronic device, the touch sensing layer comprising a plurality of touch sensors including transmitting (TX) touch sensors arranged in rows across the touch sensing layer and receiving (RX) touch sensors arranged in columns across the touch sensing layer;
  in response to determining that the touchscreen controller has not detected the active stylus pen, transmitting in a first display frame a first uplink signal from a first region of the touch sensing layer, the first uplink signal from a second region of the touch sensing layer, and the first uplink signal with opposite polarity from a third region of the touch sensing layer; and
  in response to determining that the touchscreen controller has not detected the active stylus pen, transmitting in a second display frame a second uplink signal from the first region of the touch sensing layer, the second uplink signal with opposite polarity from the second region of the touch sensing layer, and the second uplink signal from the third region of the touch sensing layer.

9. The method of claim 8,
  wherein the first uplink signal is a first binary waveform,
  wherein the first uplink signal with opposite polarity is generated by changing each lower level of the first uplink signal to a higher level and each higher level of the first uplink signal to a lower level,
  wherein the second uplink signal is a second binary waveform, and
  wherein the second uplink signal with opposite polarity is generated by changing each lower level of the second uplink signal to a higher level and each higher level of the second uplink signal to a lower level.

10. The method of claim 9,
  wherein the first uplink signal is a first beacon signal with positive polarity generated in accordance with a Universal Stylus Initiative (USI) standard, and
  wherein the second uplink signal is a second beacon signal with positive polarity generated in accordance with the USI standard.

11. The method of claim 8, further comprising:
  in response to determining that the touchscreen controller has not detected the active stylus, transmitting in a third display frame a third uplink signal from the first region of the touch sensing layer, the third uplink signal from the second region of the touch sensing layer, and the third uplink signal with opposite polarity from the third region of the touch sensing layer.

12. The method of claim 8,
  wherein the first region of the touch sensing layer includes one or more TX touch sensors located in the middle of the touch sensing layer,
  wherein the second region of the touch sensing layer includes one or more TX touch sensors located on the top of the touch sensing layer, and
  wherein the third region of the touch sensing layer includes one or more TX touch sensors located on the bottom of the touch sensing layer.

13. The method of claim 8,
  wherein the first region of the touch sensing layer includes one or more RX touch sensors located in the middle of the touch sensing layer,
  wherein the second region of the touch sensing layer includes one or more RX touch sensors located on the left side of the touch sensing layer, and
  wherein the third region of the touch sensing layer includes one or more RX touch sensors located on the right side of the touch sensing layer.

14. The method of claim 8, wherein the second region of the touch sensing layer and the third region of the touch sensing layer have the same number of touch sensors.

15. The method of claim 8, wherein detecting the active stylus pen comprises determining whether the touchscreen controller receives a downlink signal transmitted by the active stylus pen.

16. The method of claim 8, wherein the first display frame and the second display frame do not include an idle time, the idle time being a duration of time remaining in each frame after an image displayed on the display is updated.

17. The method of claim 8, wherein the first display frame and the second display frame both include an idle time, the idle time being a duration of time remaining in each frame after an image displayed on the display is updated, wherein uplink signals in the first display frame are transmitted during the idle time in the first display frame, and wherein uplink signals in the second display frame are transmitted during the idle time in the second display frame.

18. A method for operating an electronic device, the method comprising:
  detecting, by a touchscreen controller, an active stylus pen, the touchscreen controller coupled to a touch sensing layer of a display of the electronic device, the touch sensing layer comprising a plurality of touch sensors including transmitting (TX) touch sensors arranged in rows across the touch sensing layer and receiving (RX) touch sensors arranged in columns across the touch sensing layer;
  in response to determining that the touchscreen controller has detected the active stylus pen, transmitting, by the touchscreen controller, an uplink signal from a pen zone of the touch sensing layer in a frame, the pen zone including a TX touch sensor and a RX touch sensor associated with a current location of the active stylus pen, the TX touch sensor and the RX touch sensor receiving a strongest downlink signal transmitted by the active stylus pen; and
  in response to determining that the touchscreen controller has detected the active stylus pen, transmitting, by the touchscreen controller, the uplink signal with opposite polarity from a first group of touch sensors of a non-pen zone of the touch sensing layer in the frame, the non-pen zone being the plurality of touch sensors excluding the pen zone, wherein TX touch sensors and RX touch sensors in the non-pen zone that border the pen zone transmit the uplink signal.

19. The method of claim 18, further comprising: transmitting the uplink signal from a second group of touch sensors of the non-pen zone in the frame, TX touch sensors in the first group of touch sensors interleaved with TX touch sensors in the second group of touch sensors, RX touch sensors in the first group of touch sensors interleaved with RX touch sensors in the second group of touch sensor.

20. The method of claim 18, wherein the frame does not include an idle time, the idle time being a duration of time remaining in the frame after an image displayed on the display is updated.

21. The method of claim 18, wherein the frame includes an idle time, the idle time being a duration of time remaining in the frame after an image displayed on the display is updated, and wherein the uplink signal and the uplink signal with opposite polarity being transmitted during the idle time.

22. The method of claim 18, wherein the uplink signal is a beacon signal with positive polarity generated in accordance with a Universal Stylus Initiative (USI) standard.

23. The method of claim 18, wherein the pen zone comprises a fixed quantity of TX touch sensors and a fixed quantity of RX touch sensors that neighbor the TX touch sensor and the RX touch sensor that receive the strongest downlink signal.

\* \* \* \* \*